(12) United States Patent
Kelly et al.

(10) Patent No.: US 7,983,820 B2
(45) Date of Patent: Jul. 19, 2011

(54) SYSTEMS AND METHODS FOR PROVIDING PROXY CONTROL FUNCTIONS IN A WORK MACHINE

(75) Inventors: Thomas J. Kelly, Dunlap, IL (US);
Daniel C. Wood, East Peoria, IL (US);
Alan L. Ferguson, Peoria, IL (US); Paul W. Bierdeman, East Peoria, IL (US);
Brian L. Jenkins, East Peoria, IL (US);
Trent R. Meiss, Eureka, IL (US);
Andrew J. Swanson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1267 days.

(21) Appl. No.: 10/646,685

(22) Filed: Aug. 25, 2003

(65) Prior Publication Data
US 2005/0004735 A1    Jan. 6, 2005

Related U.S. Application Data

(60) Provisional application No. 60/483,915, filed on Jul. 2, 2003.

(51) Int. Cl.
*G06F 7/70* (2006.01)
(52) U.S. Cl. ............... 701/50; 701/33; 701/36; 701/48
(58) Field of Classification Search ............. 340/3.1, 340/3.5, 3.53, 3.54; 700/9; 709/246, 249; 370/466; 701/50, 33, 48, 36
See application file for complete search history.

(56) References Cited

U.S. PATENT DOCUMENTS

| | | | |
|---|---|---|---|
| 3,815,091 A | 6/1974 | Kirk | |
| 4,359,733 A | 11/1982 | O'Neill | |
| 4,414,661 A | 11/1983 | Karlstrom | |
| 4,583,206 A | 4/1986 | Rialan et al. | |
| 4,694,408 A | 9/1987 | Zaleski | ............. 701/33 |

(Continued)

FOREIGN PATENT DOCUMENTS

WO      WO 97/36442      10/1997

(Continued)

OTHER PUBLICATIONS

Carlock, M.A., °Radio to Send auto On-Board Diagnostics,' IEEE Vehicular Technology Society News, vol. 42, No. 1, pp. 20-22. Feb. 1995, Abstract Only.

(Continued)

*Primary Examiner* — Khoi Tran
*Assistant Examiner* — Brian J Broadhead
(74) *Attorney, Agent, or Firm* — Finnegan, Henderson, Farabow, Garrett & Dunner LLP

(57) ABSTRACT

Methods and systems of the present invention are provided for performing proxy control functions in an environment including one or more work machines. Such methods and systems may leverage one or more gateways to serve as a proxy for one or more distinct modules. A gateway, located in a work machine, may be programmed with proxy logic that performs functions associated with certain modules used in a work machine environment. The gateway may monitor a data link and retrieve broadcasted messages. The broadcasted messages may include source and/or destination module address identifiers. The gateway may retrieve messages from the data link based on a determination that the message is destined for a module for which the gateway serves as a proxy. The gateway may route a retrieved message, using a mapping structure, to the appropriate proxy logic that performs functions associated with the destination module.

4 Claims, 9 Drawing Sheets

U.S. PATENT DOCUMENTS

| | | | |
|---|---|---|---|
| 4,744,083 A | 5/1988 | O'Neill et al. | |
| 4,804,937 A | 2/1989 | Barbiaux et al. | |
| 4,896,261 A | 1/1990 | Nolan | |
| 4,924,391 A | 5/1990 | Hirano et al. | |
| 4,926,331 A | 5/1990 | Windle et al. | 701/35 |
| 4,929,941 A | 5/1990 | Lecocq | 340/825.2 |
| 4,975,846 A | 12/1990 | Abe et al. | |
| 5,003,479 A | 3/1991 | Kobayashi et al. | |
| 5,025,253 A | 6/1991 | DiLullo et al. | |
| 5,077,670 A | 12/1991 | Takai et al. | |
| 5,090,012 A | 2/1992 | Kajiyama et al. | 370/889 |
| 5,132,905 A | 7/1992 | Takai et al. | |
| 5,157,610 A | 10/1992 | Asano et al. | 701/32 |
| 5,168,272 A | 12/1992 | Akashi et al. | 370/222 |
| 5,218,356 A | 6/1993 | Knapp | |
| 5,274,638 A | 12/1993 | Michihira et al. | |
| 5,307,509 A | 4/1994 | Michalon et al. | |
| 5,309,436 A | 5/1994 | Hirano et al. | 370/887 |
| 5,343,319 A | 8/1994 | Moore | |
| 5,343,470 A | 8/1994 | Hideshima et al. | |
| 5,343,472 A | 8/1994 | Michihira et al. | |
| 5,365,436 A | 11/1994 | Schaller et al. | 701/33 |
| 5,387,994 A | 2/1995 | McCormack et al. | |
| 5,400,018 A | 3/1995 | Scholl et al. | |
| 5,425,051 A | 6/1995 | Mahany | |
| 5,448,479 A | 9/1995 | Kemner et al. | |
| 5,459,660 A | 10/1995 | Berra | 701/33 |
| 5,463,567 A | 10/1995 | Boen et al. | |
| 5,479,157 A | 12/1995 | Suman et al. | |
| 5,479,479 A | 12/1995 | Braitberg et al. | |
| 5,495,469 A | 2/1996 | Halter et al. | |
| 5,523,948 A | 6/1996 | Adrain | 701/99 |
| 5,526,357 A | 6/1996 | Jandrell | 370/346 |
| 5,541,840 A | 7/1996 | Gurne et al. | |
| 5,555,498 A | 9/1996 | Berra et al. | |
| 5,588,002 A | 12/1996 | Kawanishi et al. | |
| 5,604,854 A | 2/1997 | Glassey | |
| 5,606,556 A | 2/1997 | Kawanishi et al. | |
| 5,619,412 A | 4/1997 | Hapka | 701/36 |
| 5,629,941 A | 5/1997 | Kawanishi et al. | |
| 5,640,444 A | 6/1997 | O'Sullivan | |
| 5,657,317 A | 8/1997 | Mahany et al. | |
| 5,659,702 A | 8/1997 | Hashimoto et al. | |
| 5,710,984 A | 1/1998 | Millar et al. | |
| 5,712,782 A | 1/1998 | Weigelt et al. | 701/50 |
| 5,732,074 A | 3/1998 | Spaur et al. | |
| 5,737,335 A | 4/1998 | Mizuta et al. | |
| 5,737,711 A | 4/1998 | Abe | 701/29 |
| 5,764,919 A | 6/1998 | Hashimoto | |
| 5,781,125 A | 7/1998 | Godau et al. | 340/870.01 |
| 5,790,536 A | 8/1998 | Mahany et al. | 370/338 |
| 5,790,965 A | 8/1998 | Abe | |
| 5,809,432 A | 9/1998 | Yamashita | |
| 5,844,953 A | 12/1998 | Heck et al. | |
| 5,848,368 A | 12/1998 | Allen et al. | |
| 5,856,976 A | 1/1999 | Hirano | 370/401 |
| 5,884,202 A | 3/1999 | Arjomand | |
| 5,884,206 A | 3/1999 | Kim | |
| 5,896,418 A | 4/1999 | Hamano et al. | |
| 5,916,287 A | 6/1999 | Arjomand et al. | |
| 5,938,716 A | 8/1999 | Shutty et al. | |
| 5,949,776 A | 9/1999 | Mahany et al. | 370/338 |
| 5,957,985 A * | 9/1999 | Wong et al. | 701/33 |
| 5,982,781 A | 11/1999 | Przybyla et al. | |
| 5,999,876 A | 12/1999 | Irons et al. | |
| 6,009,370 A | 12/1999 | Minowa et al. | |
| 6,025,776 A | 2/2000 | Matsuura | |
| 6,037,901 A | 3/2000 | Devier et al. | |
| 6,052,632 A | 4/2000 | Iihoshi et al. | 701/36 |
| 6,052,788 A | 4/2000 | Wesinger, Jr. et al. | |
| 6,061,614 A | 5/2000 | Carrender et al. | 701/33 |
| 6,064,299 A | 5/2000 | Lesesky et al. | |
| 6,067,302 A | 5/2000 | Tozuka | 370/464 |
| 6,073,063 A | 6/2000 | Leong Ong et al. | |
| 6,075,451 A | 6/2000 | Lebowitz et al. | |
| 6,084,870 A | 7/2000 | Wooten et al. | 370/349 |
| 6,104,971 A | 8/2000 | Fackler | |
| 6,111,524 A | 8/2000 | Lesesky et al. | |
| 6,111,893 A | 8/2000 | Volftsun et al. | |
| 6,112,139 A | 8/2000 | Schubert et al. | 701/2 |
| 6,114,970 A | 9/2000 | Kirson et al. | |
| 6,122,514 A | 9/2000 | Spaur et al. | |
| 6,125,309 A | 9/2000 | Fujimoto | 701/1 |
| 6,131,019 A | 10/2000 | King | |
| 6,134,488 A | 10/2000 | Sasaki et al. | |
| 6,144,905 A | 11/2000 | Gannon | 701/36 |
| 6,151,298 A | 11/2000 | Bernhardsson et al. | |
| 6,151,306 A | 11/2000 | Ogasawara et al. | |
| 6,167,337 A | 12/2000 | Haack et al. | |
| 6,169,943 B1 | 1/2001 | Simon et al. | 701/29 |
| 6,177,867 B1 | 1/2001 | Simon et al. | |
| 6,181,994 B1 | 1/2001 | Colson et al. | |
| 6,185,491 B1 | 2/2001 | Gray et al. | 701/36 |
| 6,189,057 B1 | 2/2001 | Schwanz et al. | |
| 6,195,602 B1 | 2/2001 | Hazama et al. | 701/48 |
| 6,198,989 B1 | 3/2001 | Tankhilevich et al. | |
| 6,201,316 B1 | 3/2001 | Knecht | |
| 6,202,008 B1 * | 3/2001 | Beckert et al. | 701/33 |
| 6,202,012 B1 | 3/2001 | Gile et al. | |
| 6,225,898 B1 | 5/2001 | Kamiya et al. | |
| 6,230,181 B1 | 5/2001 | Mitchell et al. | |
| 6,236,909 B1 | 5/2001 | Colson et al. | 701/1 |
| 6,263,268 B1 | 7/2001 | Nathanson | |
| 6,272,120 B1 | 8/2001 | Alexander | |
| 6,275,167 B1 | 8/2001 | Dombrowski et al. | |
| 6,278,921 B1 | 8/2001 | Harrison et al. | 701/35 |
| 6,285,925 B1 | 9/2001 | Steffen | |
| 6,292,862 B1 | 9/2001 | Barrenscheen et al. | |
| 6,295,492 B1 | 9/2001 | Lang et al. | |
| 6,314,351 B1 | 11/2001 | Chutorash | 701/36 |
| 6,314,422 B1 | 11/2001 | Barker et al. | |
| 6,317,838 B1 | 11/2001 | Baize | |
| 6,321,142 B1 | 11/2001 | Shutty | |
| 6,321,148 B1 | 11/2001 | Leung | |
| 6,327,263 B1 | 12/2001 | Nakatsuji | 370/442 |
| 6,330,499 B1 | 12/2001 | Chou et al. | |
| 6,343,249 B1 | 1/2002 | Sakai et al. | 701/48 |
| 6,353,776 B1 | 3/2002 | Rohrl et al. | 701/1 |
| 6,356,813 B1 | 3/2002 | Sommer et al. | 701/1 |
| 6,356,822 B1 | 3/2002 | Diaz et al. | 701/33 |
| 6,370,449 B1 | 4/2002 | Razavi et al. | 701/1 |
| 6,370,456 B1 | 4/2002 | Eiting et al. | 701/33 |
| 6,381,523 B2 | 4/2002 | Sone | 701/23 |
| 6,405,111 B2 | 6/2002 | Rogers et al. | 701/33 |
| 6,407,554 B1 | 6/2002 | Godau et al. | 324/503 |
| 6,408,232 B1 | 6/2002 | Cannon et al. | 701/29 |
| 6,411,203 B1 | 6/2002 | Lesesky et al. | |
| 6,415,210 B2 | 7/2002 | Hozuka et al. | 701/29 |
| 6,427,101 B1 | 7/2002 | Diaz et al. | 701/33 |
| 6,430,164 B1 | 8/2002 | Jones et al. | 370/313 |
| 6,430,485 B1 | 8/2002 | Hullinger | 701/33 |
| 6,434,455 B1 | 8/2002 | Snow et al. | 701/33 |
| 6,434,458 B1 | 8/2002 | Laguer-Diaz et al. | 701/35 |
| 6,434,459 B2 * | 8/2002 | Wong et al. | 701/36 |
| 6,438,468 B1 | 8/2002 | Muxlow et al. | 701/3 |
| 6,438,471 B1 | 8/2002 | Katagishi et al. | 701/33 |
| 6,449,884 B1 | 9/2002 | Watanabe et al. | 37/348 |
| 6,459,969 B1 | 10/2002 | Bates et al. | 701/29 |
| 6,460,096 B1 | 10/2002 | Hesse et al. | 710/56 |
| 6,463,373 B2 | 10/2002 | Suganuma et al. | |
| 6,466,861 B2 | 10/2002 | Little | 701/114 |
| 6,470,260 B2 | 10/2002 | Martens et al. | 701/115 |
| 6,473,839 B1 | 10/2002 | Kremser et al. | 711/154 |
| 6,479,792 B1 | 11/2002 | Beiermann et al. | |
| 6,480,928 B2 | 11/2002 | Yashiki et al. | 711/103 |
| 6,484,082 B1 | 11/2002 | Millsap et al. | 701/48 |
| 6,487,717 B1 | 11/2002 | Brunemann et al. | 717/173 |
| 6,501,368 B1 | 12/2002 | Wiebe et al. | 340/3.1 |
| 6,505,105 B2 | 1/2003 | Hay et al. | 701/33 |
| 6,512,970 B1 | 1/2003 | Albert | 701/48 |
| 6,516,192 B1 | 2/2003 | Spaur et al. | 455/450 |
| 6,526,335 B1 | 2/2003 | Treyz et al. | |
| 6,526,340 B1 | 2/2003 | Reul et al. | 701/29 |
| 6,526,460 B1 * | 2/2003 | Dauner et al. | 710/65 |
| 6,529,159 B1 | 3/2003 | Fan et al. | |
| 6,529,808 B1 | 3/2003 | Diem | 701/29 |
| 6,529,812 B1 | 3/2003 | Koehrsen et al. | 701/50 |

| | | |
|---|---|---|
| 6,533,090 B2 | 3/2003 | Osborn et al. |
| 6,535,803 B1 | 3/2003 | Fennel .................. 701/33 |
| 6,539,296 B2 | 3/2003 | Diaz et al. ............. 701/33 |
| 6,542,799 B2 | 4/2003 | Mizutani et al. ......... 701/33 |
| 6,549,833 B2 | 4/2003 | Katagishi et al. ........ 701/33 |
| 6,553,039 B1 | 4/2003 | Huber et al. ............ 370/466 |
| 6,553,291 B2 | 4/2003 | Matsui ................... 701/33 |
| 6,553,292 B2 | 4/2003 | Kokes et al. ............ 701/33 |
| 6,556,899 B1 | 4/2003 | Harvey et al. ........... 701/29 |
| 6,560,516 B1 | 5/2003 | Baird et al. ............. 701/23 |
| 6,560,517 B2 | 5/2003 | Matsui ................... 701/33 |
| 6,564,127 B1 | 5/2003 | Bauerle et al. ........... 701/33 |
| 6,567,730 B2 | 5/2003 | Tanaka ................... 701/33 |
| 6,571,136 B1 | 5/2003 | Staiger .................. 700/48 |
| 6,574,734 B1 | 6/2003 | Colson et al. ........... 713/200 |
| 6,577,934 B2 | 6/2003 | Matsunaga et al. |
| 6,580,953 B1 | 6/2003 | Wiebe et al. ............ 700/86 |
| 6,580,983 B2 | 6/2003 | Laguer-Diaz et al. ...... 701/35 |
| 6,587,768 B2 | 7/2003 | Chene et al. |
| 6,608,554 B2 | 8/2003 | Lesesky et al. |
| 6,611,740 B2 | 8/2003 | Lowery et al. |
| 6,625,135 B1 | 9/2003 | Johnson et al. |
| 6,629,032 B2* | 9/2003 | Akiyama ................. 701/48 |
| 6,636,789 B2 | 10/2003 | Bird et al. |
| 6,647,323 B1 | 11/2003 | Robinson et al. |
| 6,647,328 B2 | 11/2003 | Walker |
| 6,654,669 B2* | 11/2003 | Eisenmann et al. ....... 701/1 |
| 6,662,091 B2* | 12/2003 | Wilson et al. ........... 701/33 |
| 6,671,594 B2 | 12/2003 | Miller |
| 6,687,587 B2 | 2/2004 | Kacel |
| 6,694,235 B2* | 2/2004 | Akiyama ................. 701/33 |
| 6,728,603 B2* | 4/2004 | Pruzan et al. ........... 701/1 |
| 6,738,701 B2* | 5/2004 | Wilson .................. 701/51 |
| 6,744,352 B2 | 6/2004 | Lesesky et al. |
| 6,745,144 B2 | 6/2004 | Froeschl et al. |
| 6,754,183 B1* | 6/2004 | Razavi et al. ........... 370/254 |
| 6,766,233 B2 | 7/2004 | Odinak et al. |
| 6,778,837 B2 | 8/2004 | Bade et al. |
| 6,832,142 B2 | 12/2004 | Busse |
| 6,853,896 B2 | 2/2005 | Akiyama |
| 6,865,460 B2* | 3/2005 | Bray et al. ............. 701/36 |
| 6,879,895 B2 | 4/2005 | Capps et al. |
| 6,901,449 B1 | 5/2005 | Selitrennikoff et al. |
| 6,920,380 B2 | 7/2005 | McClure et al. |
| 6,922,786 B1 | 7/2005 | Ong |
| 6,970,127 B2 | 11/2005 | Rakib |
| 6,970,459 B1 | 11/2005 | Meier |
| 6,973,378 B2 | 12/2005 | Yamada |
| 6,975,612 B1* | 12/2005 | Razavi et al. ........... 370/338 |
| 7,020,708 B2* | 3/2006 | Nelson et al. ........... 709/230 |
| 7,034,710 B2 | 4/2006 | Falada et al. |
| 7,046,638 B1 | 5/2006 | Klausner et al. |
| 7,054,319 B2 | 5/2006 | Akahane et al. |
| 7,089,098 B2 | 8/2006 | Rogg et al. |
| 7,089,343 B2 | 8/2006 | Bähren |
| 7,146,512 B2 | 12/2006 | Rothman et al. |
| 7,177,652 B1 | 2/2007 | Hopper et al. |
| 7,180,908 B2 | 2/2007 | Valavi et al. |
| 7,184,767 B2 | 2/2007 | Gandolfo |
| 7,257,472 B2 | 8/2007 | Hauer et al. |
| 7,310,356 B2 | 12/2007 | Abdo et al. |
| 7,346,435 B2 | 3/2008 | Amendola et al. |
| 7,418,481 B2 | 8/2008 | Fredriksson |
| 7,516,244 B2 | 4/2009 | Kelly et al. |
| 7,532,640 B2 | 5/2009 | Kelly et al. |
| 7,616,560 B2 | 11/2009 | Fuehrer et al. |
| 2001/0025323 | 9/2001 | Sodergren |
| 2001/0030972 A1* | 10/2001 | Donaghey ............... 370/409 |
| 2001/0041956 A1* | 11/2001 | Wong et al. ............. 701/36 |
| 2001/0047228 A1* | 11/2001 | Froeschl et al. ......... 701/1 |
| 2001/0050922 A1 | 12/2001 | Tiernay et al. |
| 2001/0051863 A1* | 12/2001 | Razavi et al. ........... 703/23 |
| 2001/0056323 A1 | 12/2001 | Masters et al. |
| 2002/0003781 A1 | 1/2002 | Kikkawa et al. |
| 2002/0006139 A1 | 1/2002 | Kikkawa et al. |
| 2002/0007237 A1 | 1/2002 | Phung et al. |
| 2002/0019689 A1 | 2/2002 | Harrison et al. |
| 2002/0032507 A1 | 3/2002 | Diaz et al. |
| 2002/0032511 A1 | 3/2002 | Murakami et al. |
| 2002/0032853 A1* | 3/2002 | Preston et al. .......... 713/151 |
| 2002/0035429 A1 | 3/2002 | Banas |
| 2002/0038172 A1 | 3/2002 | Kinugawa |
| 2002/0042670 A1 | 4/2002 | Diaz et al. |
| 2002/0069262 A1* | 6/2002 | Rigori et al. ........... 709/218 |
| 2002/0070845 A1 | 6/2002 | Reisinger et al. |
| 2002/0082753 A1 | 6/2002 | Guskov et al. |
| 2002/0099487 A1* | 7/2002 | Suganuma et al. ........ 701/48 |
| 2002/0103582 A1 | 8/2002 | Ohmura et al. |
| 2002/0103583 A1 | 8/2002 | Ohmura et al. |
| 2002/0105968 A1 | 8/2002 | Pruzan et al. |
| 2002/0107624 A1 | 8/2002 | Rutz |
| 2002/0110146 A1 | 8/2002 | Thayer et al. |
| 2002/0116103 A1* | 8/2002 | Matsunaga et al. ....... 701/29 |
| 2002/0116116 A1 | 8/2002 | Mathew et al. |
| 2002/0123828 A1 | 9/2002 | Bellmann et al. |
| 2002/0123832 A1 | 9/2002 | Gotvall et al. |
| 2002/0123833 A1 | 9/2002 | Sakurai et al. |
| 2002/0126632 A1 | 9/2002 | Terranova |
| 2002/0138178 A1 | 9/2002 | Bergmann et al. |
| 2002/0138188 A1 | 9/2002 | Watanabe et al. |
| 2002/0150050 A1 | 10/2002 | Nathanson |
| 2002/0154605 A1 | 10/2002 | Preston et al. |
| 2002/0156558 A1 | 10/2002 | Hanson et al. |
| 2002/0161495 A1 | 10/2002 | Yamaki |
| 2002/0161496 A1 | 10/2002 | Yamaki |
| 2002/0161820 A1 | 10/2002 | Pellegrino et al. |
| 2002/0167965 A1 | 11/2002 | Beasley et al. |
| 2002/0169529 A1 | 11/2002 | Kim |
| 2002/0173889 A1* | 11/2002 | Odinak et al. ........... 701/36 |
| 2002/0183904 A1 | 12/2002 | Sakurai et al. |
| 2002/0193925 A1 | 12/2002 | Funkhouser et al. |
| 2002/0196771 A1 | 12/2002 | Vij et al. |
| 2002/0198639 A1 | 12/2002 | Ellis et al. |
| 2003/0004624 A1 | 1/2003 | Wilson et al. |
| 2003/0009271 A1 | 1/2003 | Akiyama |
| 2003/0014179 A1 | 1/2003 | Szukala et al. |
| 2003/0014521 A1* | 1/2003 | Elson et al. ............ 709/225 |
| 2003/0016636 A1 | 1/2003 | Tari et al. |
| 2003/0021241 A1 | 1/2003 | Dame et al. |
| 2003/0028297 A1 | 2/2003 | Iihoshi et al. |
| 2003/0033061 A1 | 2/2003 | Chen et al. |
| 2003/0035437 A1 | 2/2003 | Garahi et al. |
| 2003/0037466 A1 | 2/2003 | Komatsu et al. |
| 2003/0043739 A1 | 3/2003 | Reinold et al. |
| 2003/0043750 A1 | 3/2003 | Remboski et al. |
| 2003/0043779 A1 | 3/2003 | Remboski et al. |
| 2003/0043793 A1 | 3/2003 | Reinold et al. |
| 2003/0043799 A1 | 3/2003 | Reinold et al. |
| 2003/0043824 A1 | 3/2003 | Remboski et al. |
| 2003/0046327 A1 | 3/2003 | Reinold et al. |
| 2003/0046435 A1 | 3/2003 | Lind et al. |
| 2003/0050747 A1 | 3/2003 | Kamiya |
| 2003/0053433 A1 | 3/2003 | Chun |
| 2003/0060953 A1 | 3/2003 | Chen |
| 2003/0065771 A1 | 4/2003 | Cramer et al. |
| 2003/0069680 A1 | 4/2003 | Cohen et al. |
| 2003/0074118 A1* | 4/2003 | Rogg et al. ............. 701/31 |
| 2003/0088347 A1 | 5/2003 | Ames |
| 2003/0093199 A1* | 5/2003 | Mavreas ................. 701/33 |
| 2003/0093203 A1 | 5/2003 | Adachi et al. |
| 2003/0093204 A1 | 5/2003 | Adachi et al. |
| 2003/0097477 A1 | 5/2003 | Vossler |
| 2003/0105565 A1 | 6/2003 | Loda et al. |
| 2003/0105566 A1* | 6/2003 | Miller .................. 701/33 |
| 2003/0114966 A1 | 6/2003 | Ferguson et al. |
| 2003/0117298 A1 | 6/2003 | Tokunaga et al. ........ 340/989 |
| 2003/0120395 A1 | 6/2003 | Kacel .................. 701/1 |
| 2003/0130776 A1 | 7/2003 | Busse .................. 701/36 |
| 2003/0167112 A1* | 9/2003 | Akiyama ................ 701/36 |
| 2003/0182467 A1 | 9/2003 | Jensen et al. .......... 709/317 |
| 2003/0200017 A1* | 10/2003 | Capps et al. ........... 701/36 |
| 2004/0039500 A1 | 2/2004 | Amendola et al. ....... 701/29 |
| 2004/0081178 A1* | 4/2004 | Fujimori ............... 370/401 |
| 2004/0111188 A1* | 6/2004 | McClure et al. ........ 701/1 |
| 2004/0158362 A1* | 8/2004 | Fuehrer et al. ........ 701/1 |
| 2004/0167690 A1* | 8/2004 | Yamada ................ 701/33 |
| 2004/0225740 A1* | 11/2004 | Klemba et al. ......... 709/227 |
| 2005/0002354 A1 | 1/2005 | Kelly et al. |

| | | | |
|---|---|---|---|
| 2005/0002417 A1 | 1/2005 | Kelly et al. | |
| 2005/0005167 A1 | 1/2005 | Kelly et al. | |
| 2005/0021860 A1 | 1/2005 | Kelly et al. | |
| 2005/0243779 A1* | 11/2005 | Bolz | 370/338 |

FOREIGN PATENT DOCUMENTS

| | | |
|---|---|---|
| WO | WO 00 77620 | 12/2000 |
| WO | WO 01 26338 | 4/2001 |
| WO | WO 03 051677 | 6/2003 |

OTHER PUBLICATIONS

Davis, Jr. P.D. et al., "Hydrometeorological Data Collection System for Lake Ontario," IEEE '71 Engineering in the Ocean Environment Conference, pp. 180-183, 1971.

Leinfelder, C. et al., "Radio Diagnostics for the ICE [electric locomotive]," Signal und Draht, vol. 89, Nos. 7-8, pp. 18-20, 22, Jul.-Aug. 1997, Abstract Only.

Senninger, H., "PROMETHEUS Phase 3, Teilprojekt: On-Board Network, Schlussbericht," NTIS Journal Announcement, GRA19621, Apr. 1995, Abstract Only.

Carlock, M.A., "Incorporation of Radio Transponders into Vehicular On-Board Diagnostic Systems," Leading Change: the Transportation Electronic Revolution: Proceedings of the 1994 International Congress on Transportation Electronics, pp. 111-114, 1994.

Katoh, T. et al., "Electronics Progress in Automotive Parts and Service Engineering," Leading Change: the Transportation Electronic Revolution: Proceedings of the 1994 International Congress on Transportation Electronics, pp. 497-502, Oct. 1994.

Mogi, T., "Prospects for Failure Diagnostics of Automotive Electronic Control Systems," Leading Change: the Transportation Electronic Revolution: Proceedings of the 1994 International Congress on Transportation Electronics, pp. 477-488, Oct. 1994.

Choe, Howard C. et al., "Neural Pattern Identification of Railroad Wheel-Bearing Faults From Audible Acoustic Signals: Comparison of FFT, CWT, and DWT Features," Proceedings SPIE—The International Society for Optical Engineering, Wavelett Applications IV, vol. 3078, pp. 480-496, Apr. 1997.

Comer, D. E., "Internetworking with TCP/IP vol. I" © 1995 Prentice-Hall Inc., Chapter 29 (pp. 489-509).

Deering, S. et al., RFC 1993, "International Protocol, Version 6 (IPv6) Specification," © 1995 Network Working Group, pp. 1-37, website: http://www.ietf.org/rfc/rfc1883.txt.

Hagino, J. et al., RFC 3142, "An IPv6-to-IPv4 Transport Relay Translator," © 2001 The Internet Society (pp. 1-5 and 7-11), website: http://www.ietf.org/rfc/rfc3142.txt.

Lind, R. et al., "The Network Vehicle—A Glimpse Into the Future of Mobile Multi-Media," Digital Avionics Systems Conference, 1998 Proceedings 17th DASC, The AIAA/IEEE/SAE, Oct. 31-Nov. 7, 1998, pp. 121-11-121-8, vol. 2, Institute of Electrical and Electronics Engineers, Bellevue, WA.

Microsoft Technet, The Cable Guy—Apr. 2003, "Windows Peer-to-Peer Networking" (6 pages) website: http//www.archive.org/web/20040612130553 and http://www.microsoft.com/technet/community/columns/cableguy/cg0403.mspx.

Office Action issued in U.S. Appl. No. 10/646,684, dated Aug. 23, 2007 (13 pages).

Office Action issued in U.S. Appl. No. 10/646,684, dated Mar. 31, 2008 (16 pages).

Office Action issued in U.S. Appl. No. 10/646,684, dated Jul. 10, 2008 (3 pages).

Office Action issued in U.S. Appl. No. 10/646,684, dated Nov. 25, 2008 (14 pages).

Office Action issued in U.S. Appl. No. 10/646,714, dated Feb. 9, 2007 (10 pages).

Office Action issued in U.S. Appl. No. 10/646,714, dated Oct. 9, 2007 (11 pages).

Ofice Action issued in U.S. Appl. No. 10/646,714, dated Jan. 31, 2008 (3 pages).

Office Action issued in U.S. Appl. No. 10/646,714, dated May 14, 2008 (10 pages).

Office Action issued in U.S. Appl. No. 10/646,714, dated Nov. 14, 2008 (12 pages).

Office Action issued in U.S. Appl. No. 10/646,716, dated May 9, 2008 (20 pages).

Office Action issued in U.S. Appl. No. 10/646,716, dated Nov. 24, 2008 (24 pages).

Office Action issued in U.S. Appl. No. 10/646,809, dated Feb. 7, 2007 (17 pages).

Office Action issued in U.S. Appl. No. 10/646,809, dated Aug. 10, 2007 (15 pages).

Office Action issued in U.S. Appl. No. 10/646,809, dated Jan. 25, 2008 (17 pages).

Office Action issued in U.S. Appl. No. 10/646,809, dated Jun. 30, 2008 (12 pages).

Office Action issued in U.S. Appl. No. 10/646,809, dated Dec. 5, 2008 (14 pages).

Perkins, C. and Royer, E., "Ad-hoc On-demand Distance Vector Routing," Feb. 1999, IEEE Conference Proceeding, pp. 90-100.

Peterson and Davie, Computer Networks: A System Approach, 2nd Edition, Morgan Kaugmann Publishers, Oct. 1999, pp. 284-292.

* cited by examiner

US 7,983,820 B2

SYSTEMS AND METHODS FOR PROVIDING PROXY CONTROL FUNCTIONS IN A WORK MACHINE

CROSS REFERENCE TO RELATED APPLICATIONS

This application claims the benefit of U.S. Provisional Application Ser. No. 60/483,915 entitled "Systems and Methods for Interfacing Off-Board and On-Board Networks in a Work Machine," filed Jul. 2, 2003, owned by the assignee of this application and expressly incorporated herein by reference in its entirety.

This application is related to U.S. application Ser. No. 10/646,684, entitled "SYSTEMS AND METHODS FOR PROVIDING SERVER OPERATIONS IN A WORK MACHINE," filed Aug. 25, 2003, U.S. application Ser. No. 10/646,714, entitled "SYSTEMS AND METHODS FOR PROVIDING SECURITY OPERATIONS IN A WORK MACHINE," filed Aug. 25, 2003, U.S. application Ser. No. 10/646,809, entitled "SYSTEMS AND METHODS FOR PROVIDING NETWORK COMMUNICATIONS BETWEEN WORK MACHINES," filed Aug. 25, 2003, and U.S. application Ser. No. 10/646,716, entitled "SYSTEMS AND METHODS FOR PERFORMING PROTOCOL CONVERSIONS IN A WORK MACHINE," filed Aug. 25, 2003, each owned by the assignee of this application and expressly incorporated herein by reference in its entirety.

TECHNICAL FIELD

This invention relates generally to network interface systems and more particularly, to systems and methods for providing a virtual control module in a work machine environment.

BACKGROUND

An important feature in modern work machines (e.g., fixed and mobile commercial machines, such as construction machines, fixed engine systems, marine-based machines, etc.) is the on-board electronic communications, monitoring, and control network. An on-board network includes many different modules connected to different types of communication links. These links may be proprietary and non-proprietary, such as manufacturer-based data links and communication paths based on known industry standards (e.g., J1939, RS-232, RP1210, RS-422, RS-485, MODBUS, CAN, etc.). Other features associated with work machine environments are off-board networks, such as wireless networks (e.g., cellular), satellite networks (e.g., GPS), and TCP/IP-based networks.

On-board modules may communicate with other on-board or off-board modules to perform various functions related to the operation of the work machine. For example, display modules may receive sensor data from an engine control module via a J1939 data link, while another control module connected to a proprietary data link may provide data to another module connected to the same link. Also, an on-board module may send data to an off-board system using a different communication path extending from the work machine to the off-board system.

Existing work machine environments typically include several control modules, each having individual addresses on one or more data links. Messages intended for these modules may be broadcasted on the data link for receipt by the respective control modules. While the logical functionality of such control modules are important, the physical devices themselves and their respective locations on the network are, in many instances, irrelevant. In fact, implementing various module functionality by way of discrete physical devices may frustrate system performance, operation, and design. Implementing several discrete modules may pose problems for system maintenance and diagnostics. Further, implementing, maintaining, and integrating several discrete modules in a work machine environment may be costly and time consuming. For example, implementing several specialized components may necessitate multiple networks and communications adapters.

Moreover, problems arise when modules connected to different types of data links need to communicate. These problems become especially acute as the number of data links and protocols on a given work machine increases. For example, various protocols (e.g., J1939, RS-232, RP1210, RS-422, RS-485, MODBUS, CAN, ISO11783, ATA, etc.) may be required to accommodate specialized modules in current work machine environments. Further, problems arise when legacy systems need to communicate with other, perhaps newer, systems that are not compatible with the legacy protocols. To address these problems, conventional systems may incorporate various interface devices to facilitate communications between different types of data links. Although this solution may be functionally acceptable in some instances, their implementations are restricted due to the hardware and service capabilities associated with the types of data links used in a work machine. Further, the additional hardware may take up valuable space needed for other components used by the machine.

U.S. Pat. No. 6,512,970 to Albert describes an electronic control unit for use with autonomously controlled assemblies in motor vehicles. Albert's control unit uses non-overlapping memory zones, each assigned a diagnostic and programming address, and a central control device that interacts with the memory zones using time division multiplexing. Each memory zone, in conjunction with the central control device, forms a virtual control unit for a vehicle assembly. Although Albert provides a solution for providing virtual control units, the system has limited flexibility in terms of both architecture and application. The electronic control unit described by Albert uses non-overlapping memory zones and does not share code through its memory. Moreover, to provide virtual control, the system requires time-division multiplex communication between a central control device and the non-overlapping memories. In addition, Albert's system cannot provide effective virtual control services in a multi-protocol environment in which devices require both simultaneous and discrete interaction.

Methods, systems, and articles of manufacture consistent with certain embodiments of the present invention are directed to solving one or more of the problems set forth above.

SUMMARY OF THE INVENTION

Methods and systems of the present invention may be provided for performing proxy control functions in an environment including one or more work machines, each including one or more modules coupled to one or more data links. Consistent with embodiments of the present invention, a gateway, located in a work machine, may monitor a data link (e.g., a proprietary data link) for broadcasted messages. The messages may include source and/or destination address identifiers. In exemplary embodiments of the present invention, the gateway may intercept a message from the data link based on the source and/or the destination address included in the message. Upon receiving a message from the data link, the gateway may use a mapping structure to route the message to proxy logic that performs functions associated with the destination module. The proxy logic may be located in the gateway and may perform functions that are similar to the destination module.

Consistent with certain embodiments of the present invention, methods and system may receive a message from a first data link (e.g., an RS-232 data link) interfaced by control logic included in a gateway. The message may be intended for a destination module. Methods and systems may identify, via an address map, the location of the destination module in a work machine environment. The message may be formatted and routed, via the address map, to the destination module over a second data link (e.g., a proprietary data link) coupled to the gateway.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Figure 1:
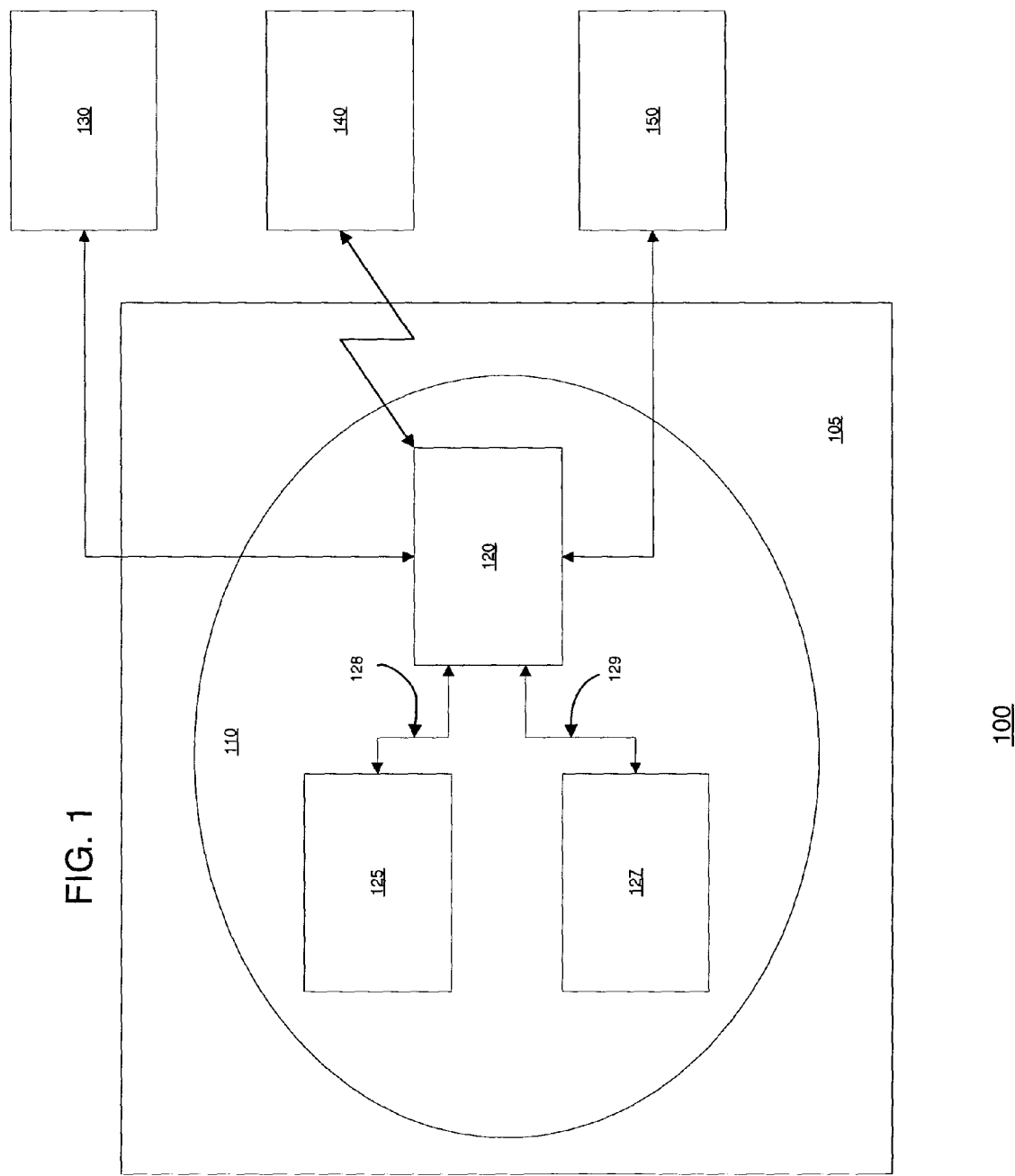
FIG. 1 is a block diagram of an exemplary system that may be configured to perform certain functions consistent with embodiments of the present invention.

Reference will now be made in detail to exemplary aspects of the present invention, examples of which are illustrated in the accompanying drawings. Wherever possible, the same reference numbers will be used throughout the drawings to refer to the same or like parts.
Overview FIG. 1 illustrates an exemplary system 100 in which features and principles consistent with an embodiment of the present invention may be implemented. As shown in FIG. 1, system 100 may include a work machine 105 including an on-board system 110 comprising a gateway 120 and on-board modules 125, 127. System 100 may also include one or more off-board systems 130-150. Although gateway 120 is shown as a separate element, methods and systems consistent with the present invention may allow gateway 120 to be included in one or more elements, such as on-board modules 125 and/or 127.

A work machine, as used herein, refers to a fixed or mobile machine that performs some type of operation associated with a particular industry, such as mining, construction, farming, etc. and operates between or within work environments (e.g., construction site, mine site, power plant, etc.). A non-limiting example of a fixed machine includes an engine system operating in a plant, off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment.

An on-board module, as used herein, may represent any type of component operating in work machine 105 that controls or is controlled by other components or sub-components. For example, an on-board module may be an operator display device, an Engine Control Module (ECM), a power system control module, a Global Positioning System (GPS) interface device, an attachment interface that connects one or more sub-components, and any other type of device work machine 105 may use to facilitate operations of the machine during run time or non-run time conditions (i.e., machine engine running or not running, respectively).

An off-board system, as used herein, may represent a system that is located remote from work machine 105. An off-board system may be a system that connects to on-board system 110 through wireline or wireless data links. Further, an off-board system may be a computer system including known computing components, such as one or more processors, software, display, and interface devices that operate collectively to perform one or more processes. Alternatively, or additionally, an off-board system may include one or more communications devices that facilitates the transmission of data to and from on-board system 110.

Gateway 120 represents one or more interface devices configured to perform functions consistent with various embodiments of the present invention. Gateway 120 may be configured with various types of hardware and software depending on its application within a work machine. Thus, in accordance with embodiments of the invention, gateway 120 may provide interface capability that facilitates the transmission of data to and from on-board system 110, performs various data processing functions, and maintains data for use by one or more on-board modules or off-board systems. For example, gateway 120 may be configured to perform protocol conversions (e.g., tunneling and translations), intelligent routing, and server-based operations, such as data provisioning, application provisioning, Web server operations, electronic mail server operations, data traffic management, and any other type of server-based operations that enable on-board system 110 to retrieve, generate, and/or provide data with on-board and/or off-board systems. For clarity of explanation, FIG. 1 depicts gateway 120 as a distinct element. However, consistent with principles of the present invention, "gateway" functionality may be implemented via software, hardware, and/or firmware within one or more modules (e.g., 125 and/or 127) on a network, which controls a system on a work machine and communicates with an off-board system. Thus, gateway 120 may, in certain embodiments, represent functionality or logic embedded within another element.

On-board module 125 represents one or more on-board modules connected to one or more proprietary data links 128 included in on-board system 110. On-board module 127 may be one or more on-board modules connected to a non-proprietary data link 129, such as Society of Automotive Engineers (SAE) standard data links including Controller Area Network (CAN), J1939, etc. standard data links.

As shown in FIG. 1, gateway 120 also interfaces with one or more off-board systems 130-150. In one exemplary embodiment, off-board systems 130-150 include, for example, computer system 130, computer system 140, and service port system 150.

Computer system 130 represents one or more computing systems each executing one or more software applications. For example, computer system 130 may be a workstation, personal digital assistant, laptop, mainframe, etc. Computer system 130 may include Web browser software that requests and receives data from a server when executed by a processor and displays content to a user operating the system. In one embodiment of the invention, computer system 130 is connected to on-board system 110 through one or more wireline based data links, such as a Local Area Network (LAN), an Extranet, and the Internet using an Ethernet connection based on TCP/IP.

Computer system 140 also represents one or more computing systems each executing one or more software applications. Computer system 140 may be a workstation, personal digital assistant, laptop, mainframe, etc. Also, computer system 140 may include Web browser software that requests and receives data from a server when executed by a processor and displays content to a user operating the system. In one embodiment of the invention, computer system 140 is connected to on-board system 110 through one or more wireless based data links, such as cellular, satellite, and radio-based communication data links.

Computer systems 130 and 140 may each be associated with a user (e.g., customer), multiple users, a business entity (dealer, manufacturer, vendor, etc.), a department of a business entity (e.g., service center, operations support center, logistics center, etc.), and any other type of entity that sends and/or receives information to/from on-board system 110. Further, computer system 130 and 140 may each execute off-board software applications that download or upload information to/from on-board system 110 via gateway 120. In certain embodiments, computer systems 130 and 140 may include one or more controllers such as a PLC (Programmable Logic Controller), which could be used in plants/factories.

Service system 150 represent one or more portable, or fixed, service systems that perform diagnostics and/or service operations that include receiving and sending messages to on-board system 110 via gateway 120. For example, service system 150 may be a electronic testing device that connects to on-board system 120 through an RS-232 serial data link. Using service system 150, a user or an application executed by a processor may perform diagnostics and service operations on any of on-board system modules 125, 127 through gateway 120.

Figure 2:
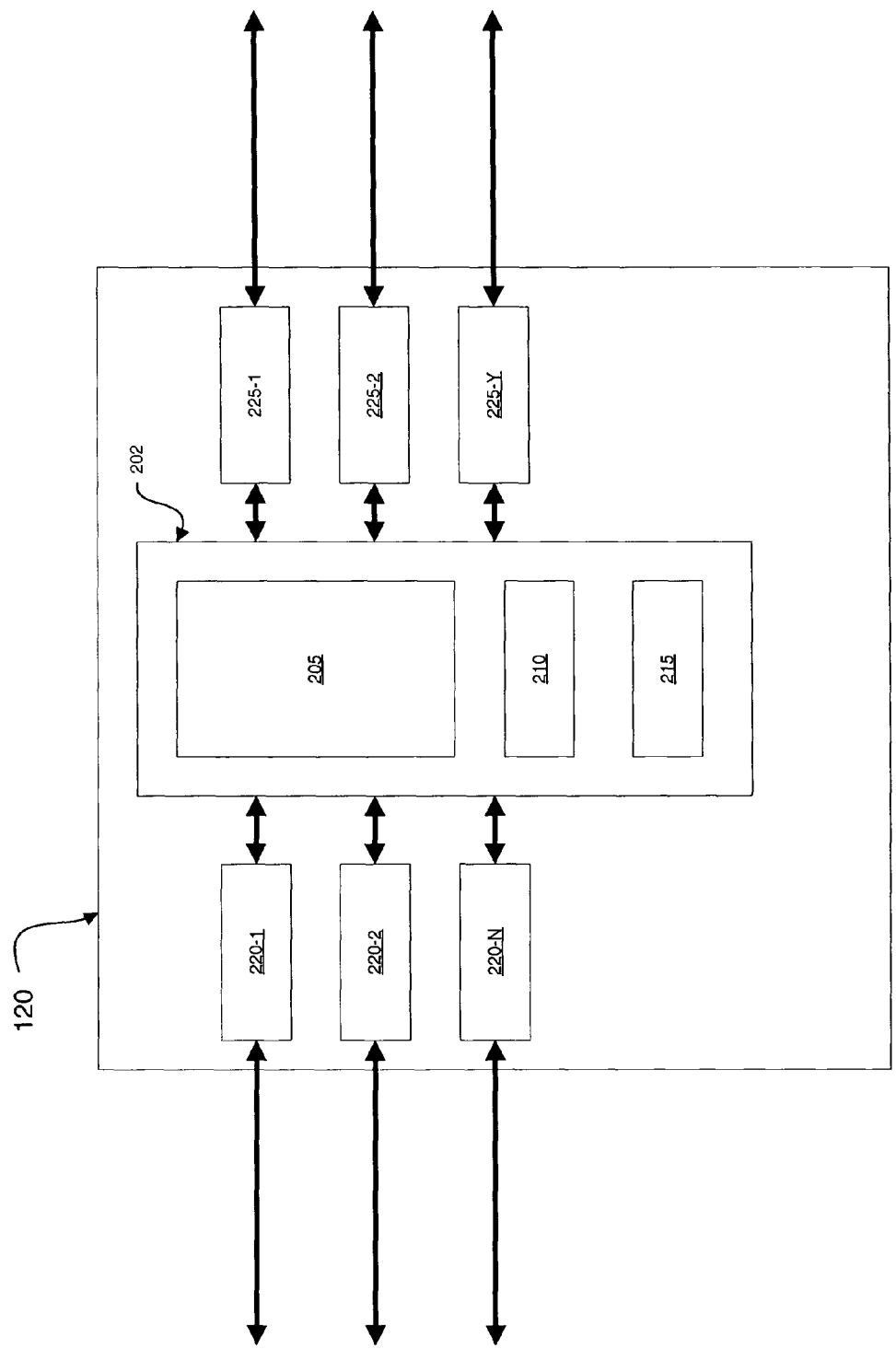
FIG. 2 is a block diagram of an exemplary gateway consistent with embodiments of the present invention.

In one embodiment, gateway 120 may include various computing components used to perform server based services (e.g., communications services, file services, database services, etc.) for on-board system 110. FIG. 2 shows an exemplary block diagram of gateway 120 consistent with embodiments of the present invention. As shown, gateway 120 includes a digital core 202, on-board data link port components 220-1 to 220-N, and off-board data link port components 225-1 to 225-Y.

Digital core 202 includes the logic and processing components used by gateway 120 to perform its interface, communications, and server functionalities. In one embodiment, digital core 202 includes one or more processors 205 and internal memories 210 and 215. Processor 205 may represent one or more microprocessors that execute software to perform the gateway features of the present invention. Memory 210 may represent one or more memory devices that temporarily store data, instructions, and executable code, or any combination thereof, used by processor 205. Memory 215 may represent one or more memory devices that store data temporarily during operation of gateway 120, such as a cache memory, register devices, buffers, queuing memory devices, and any type of memory device that maintains information. Memories 210 and 215 may be any type of memory device, such as flash memory, Static Random Access Memory (SRAM), and battery backed non-volatile memory devices.

On-board data link ports 220-1 to 220-N represent one or more interface devices that interconnect one or more on-board data links with digital core 202. For example, on-board data link ports 220-1 to 220-N may connect to proprietary and non-proprietary data links 128, 129, respectively. In one embodiment, on-board data link ports 220-1 to 220-N interfaces with one or more proprietary data links, one or more CAN data links (e.g., J1939, galvanized isolated CAN data links, etc.), one or more RS-232 serial based data links (e.g., MODBUS, PPP, NMEA183, etc.), and one or more RS-242 data links. On-board data link ports 220-1 to 220-N may also include virtual (i.e., software) ports that allow a single connection to act as if there were multiple connections.

Off-board data link ports 225-1 to 225-Y represent one or more interface devices that interconnect one or more off-board data links with digital core 202. For example, off-board data link ports 225-1 to 225-Y may connect gateway 120 to one or more RS-232 data links, RS-485 data links, Ethernet data links, MODBUS data links, radio data links, and/or satellite data links, etc. It is appreciated that gateway 120 may be configured to interface with any type of data link used in an on-board or off-board system network.

The gateway 120 shown in FIG. 2 is exemplary and not intended to be limiting. A number of additional components may be included in gateway 120 that supplement and/or compliment the operations of digital core 202 and data link ports 220 and 225. For example, gateway 120 may also include an internal power supply, a real time clock, hour meter, sensor inputs for receiving signals from one or more sensors monitoring the operations of a work machine component, memory arrays, etc. Moreover, as mentioned above, gateway 120 may, in certain embodiments, be implemented (e.g., via logic and/or circuitry) within one or more modules coupled to a given network.

Figure 3:
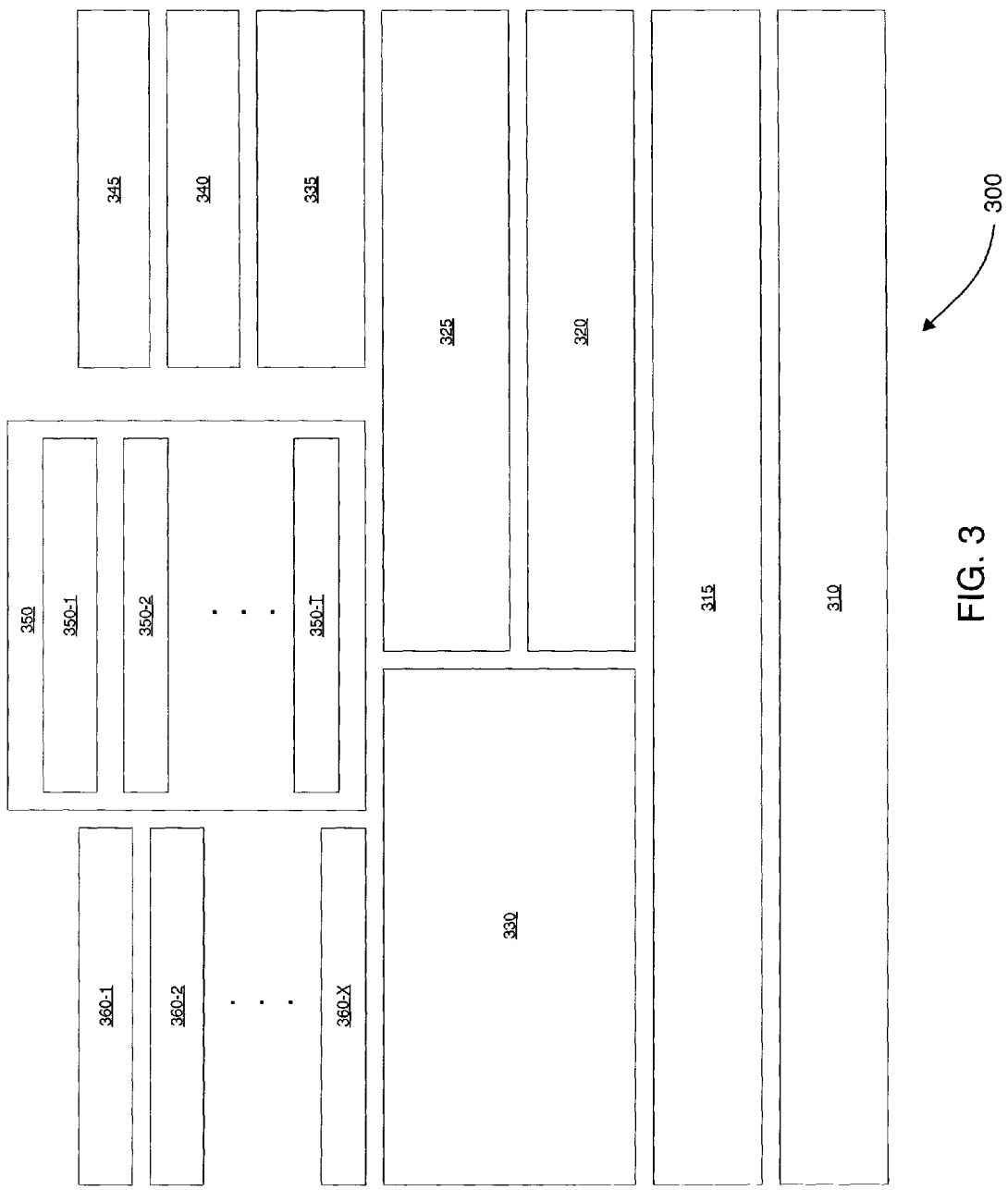
FIG. 3 is a block diagram of an exemplary software architecture for a gateway consistent with embodiments of the present invention.

In operation, digital core 202 executes program code to facilitate communications between on-board modules and/or off-board systems. In one embodiment of the present invention, memory 210 includes application and server-based software programs that allow information received through either data link ports 220 and 225 to be processed and/or transferred to the proper destination module/system in the proper format. FIG. 3 illustrates an exemplary software architecture model 300 that may be implemented by gateway 120 consistent with embodiments of the present invention.

Exemplary model 300 may include hardware interface software, such as boot executable software and driver software layer 310, that drive the on-board and off-board data link ports 220 and 225 connecting the multiple types of data links to gateway 120 (e.g., Ethernet, RS-232, CAN, proprietary data links, etc.). A core hardware access layer 315 interfaces boot executable layer 310 and core software layer 330, which includes software associated with runtime operations of gateway 120. Layer 320 includes operating system software executed by processor 205, and layer 325 is a network stack level including one or more protocol stacks used to perform communication services, such as formatting data messages for specific protocols, etc. In one embodiment, model 300 may also include a Web server layer 335 that includes server software used by gateway 120 to perform Web server operations, such as HTML processing, content generation, Web page request processing, etc. Further, model 300 may also include one or more layers 340-360 representing application programs executable by gateway 120. For example, layers 340, 345 may represent server applications executed by gateway 120 to perform certain services, such as data provisioning, application management, traffic management, etc. Layers 360-1 to 360-X may represent application programs that perform operations associated with functions typically performed by certain types of on-board modules connected to an on-board network, such as a Customer Communication Module (CCM), a communication adapter, a GPS Interface Module (GPSIM), a third party interface software, an Engine Vision Interface Module (EVIM), and a product link module.

Model 300 may also include an inter-data link gateway layer 350 that includes one or more gateway applications 350-1 to 350-T, that perform protocol conversion operations for converting information associated with one type of data link to another. The conversion operations may include protocol translation and tunneling features. Processor 205 may execute a selected one of application programs 350-1 to 350-T based on the type of format required by an outgoing data link. For example, application layer 350-1 may represent a protocol conversion program that allows data messages received in a proprietary data link to be converted to a J1939 format for transmission across a J1939 data link. Other types of conversion applications may be configured in model 300 including application layers that combine one or more protocol conversion capabilities.

Proxy Control Functions

Consistent with embodiments the present invention, methods and systems may leverage one or more gateways 120 in order to provide a virtual control module in a work machine network. As used herein, the term "virtual control module" refers to a single module (e.g., a hardware device) that virtually represents multiple control modules on a data link. In such embodiments, gateway 120 may include hardware, firmware, and/or software (e.g., application programs 360-1 to 360-X) for performing operations associated with functions performed by various on-board modules connected to an on-board network. For example, gateway 120 may be programmed with logic corresponding to a CCM, a communication adapter, a GPSIM, a third party interface software, an EVIM, and/or a product link module, i.e., proxy control logic. A single gateway may therefore replace a plurality of distinct control modules in a given work machine environment. With such proxy logic, gateway 120 may serve as a virtual control module in a work machine network. That is, gateway 120 may serve as a proxy device for a plurality of distinct control modules. Consistent with embodiments of the present invention, methods and systems may enable one or more gateways to intercept messages transmitted on a data link and process such messaged using appropriate proxy logic. Accordingly, a message directed to an address that would otherwise be recognized by an on-board network as associated with an actual control module will be intercepted by gateway 120 and processed accordingly. In this fashion, gateway 120 may serve as a virtual control module.

Figure 4:
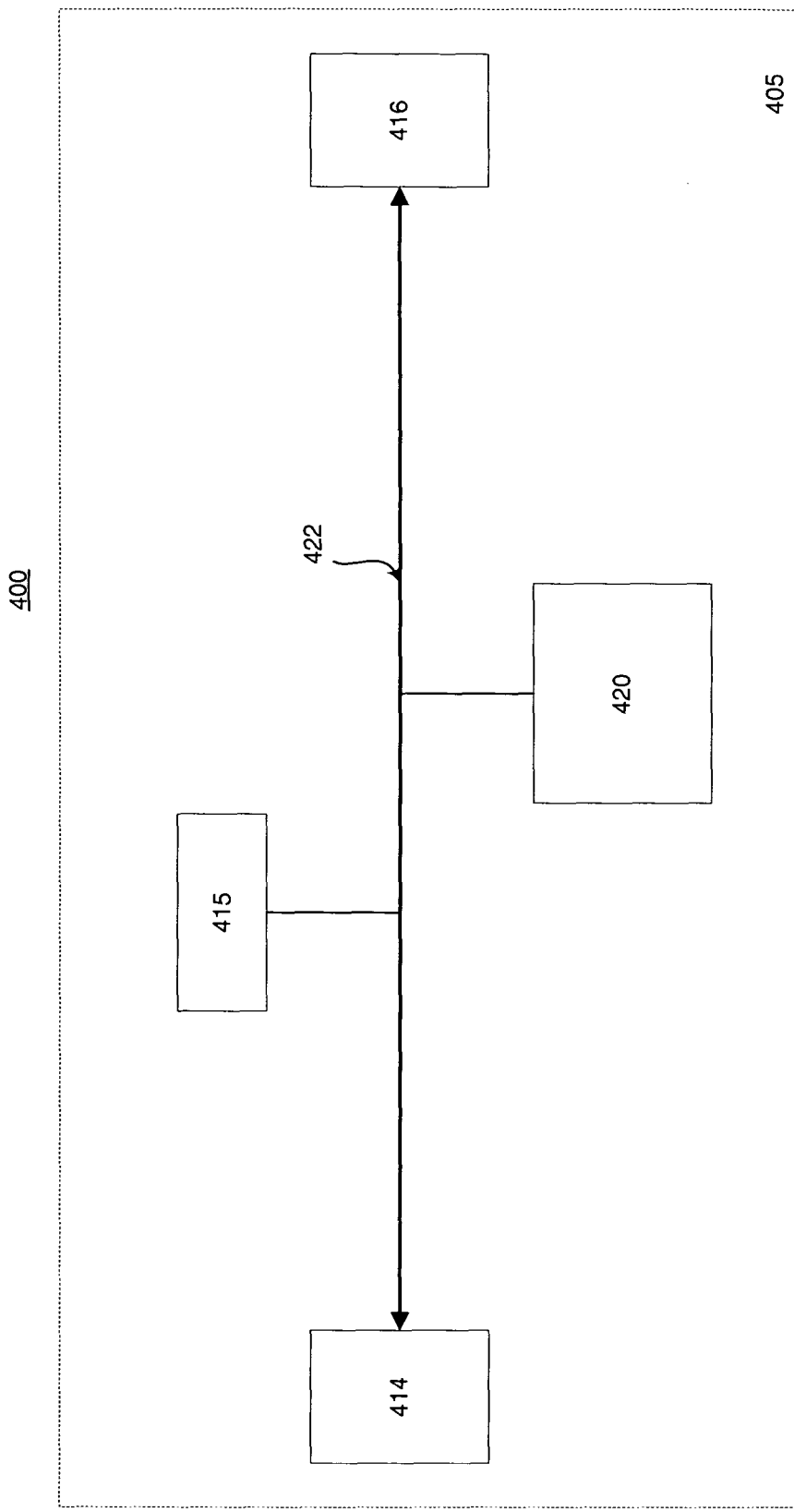
FIG. 4 is a block diagram of an exemplary work machine environment consistent with embodiments of the present invention.

FIG. 4 is a block diagram of a work machine environment 400, associated with a work machine 405 (either fixed or mobile), in which one or more gateways are leveraged to perform proxy control functions. As illustrated in FIG. 4, environment 400 may include an engine system 414 operating in work machine 405 and connected to an on-board data link 422. In certain embodiments, data link 422 may be a proprietary data link ("PDL"). Data link 422 may, however, include any type of proprietary and/or non-proprietary on-board data link, such as J1939, MODBUS, CAN, etc. Data link 422 may be similar to data link 128 and/or 129 described in connection with FIG. 1. In embodiments of the present invention, one or more on-board modules (e.g., 415, 416) may be coupled to data link 422. Modules 415 and 416 may include any type of on-board module, component, or sub-component operating within work machine 405. For example, modules 415 and 416 may be ECMs, J1939 display devices (e.g., sensor gauges, etc.), EVIMs, on-board diagnostic systems, etc. The illustrated modules could also represent components and systems associated with work machine 405 such as propulsion, communications, and navigation systems.

Figure 5:
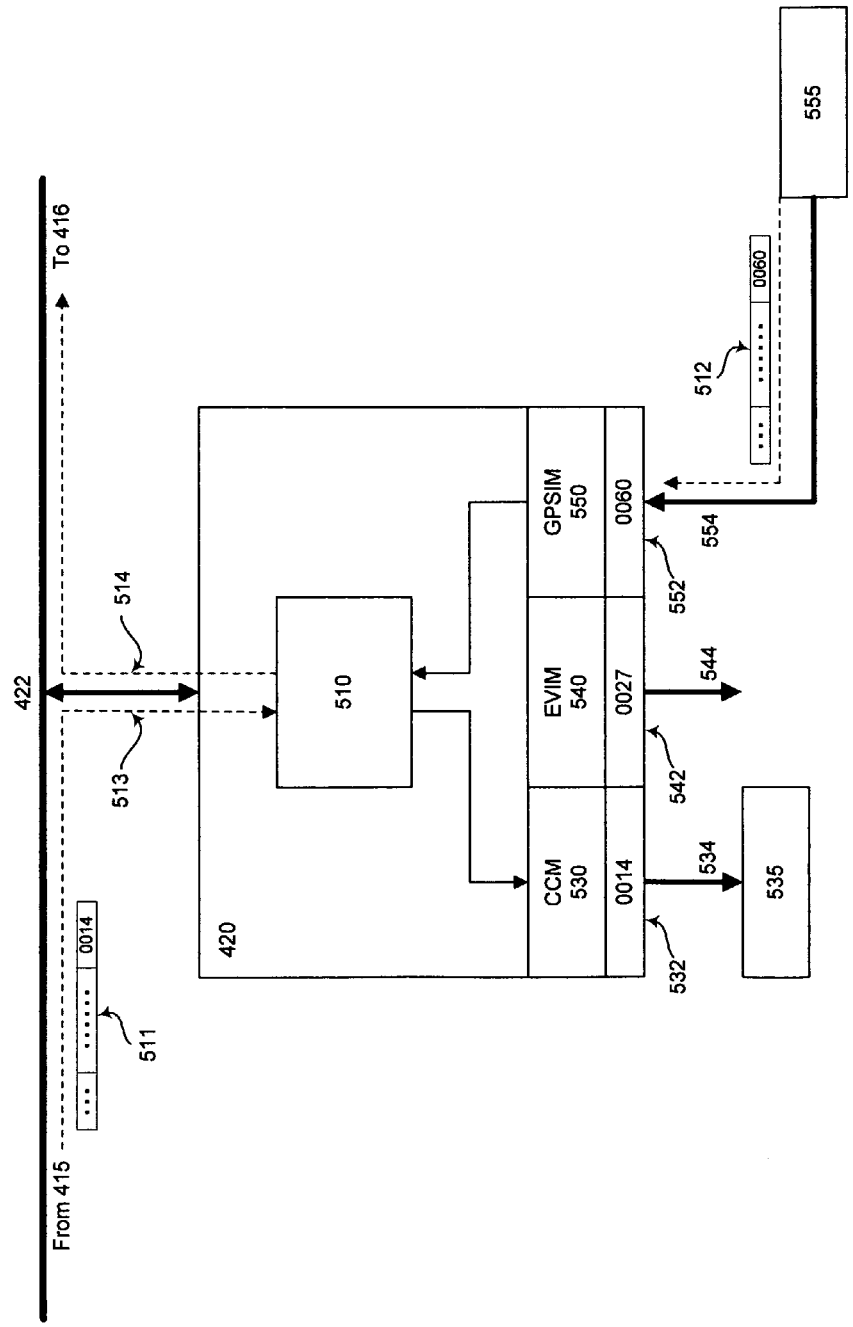
FIG. 5 is a block diagram of an exemplary gateway that is configured as a proxy control module consistent with embodiments of the present invention.

As illustrated in FIG. 4, work machine 405 may include a gateway 420, which may be similar in configuration and operation as gateway 120 described above in connection with FIGS. 1 and 2. In system 400, gateway 420 may be coupled to data link 422 and configured as a virtual control module. As such, gateway 420 may intercept messages (from data link 422) originating from various components (e.g., module 415) and destined for control modules for which gateway 420 serves as a proxy. Gateway 420 may also receive messages originating from on-board and/or off-board components and route such messages to modules coupled to data link 422. Accordingly, gateway 420 may include an address map, software logic corresponding to one or more replaced control modules, and corresponding address identifiers for the software logic. FIG. 5 illustrates such elements which may be included in gateway 420.

As illustrated in FIG. 5, gateway 420 may include a plurality of control proxy logic elements (e.g., 530, 540, 550) corresponding to the control modules for which gateway 420 is assuming functionality. For example, gateway 420 may include proxy logic corresponding to a CCM, an EVIM, and a GPSIM. Although CCM, EVIM, and GPSIM logic elements are shown in FIG. 5, gateway 420 may be programmed with different numbers and types of logic elements. In certain embodiments, proxy logic elements may be implemented via one or more memory components (e.g., memory 210). In one example, proxy logic elements may be implemented via software modules in a single software package or throughout a plurality of software packages. Each of the proxy logic elements may share information and/or code present in the software modules and/or a given software package(s). For example, a software package may include a plurality of logic element modules and include code that is accessible to and/or shared by the modules.

Consistent with embodiments of the present invention, each of the control logic elements may interface with one or more data links (e.g., 534, 544, 554) compatible with the type of operations used by the replaced control module in normal on-board system operations. Such interfaced data links may be any type of proprietary and/or non-proprietary data links and may be coupled to corresponding on-board and/or off-board modules (e.g., elements 535 and 555). For instance, a CCM control module logic element 535 may interface with an M5X or RS-232 data link for sending information to a destination module on data link 422. GPSIM logic, on the other hand, may receive (e.g., via an RS-232 data link) a message from an off-board component (e.g., a satellite device 555) destined for a module attached to data link 422 (e.g., 416).

Each logic element included in gateway 420 may be associated with a specific identifier (e.g., 532, 542, 552). Such identifiers may include any textual, numerical, and/or symbolic element. In certain embodiments, gateway 420 may be pre-configured with logic elements according to a particular work machine environment. In addition, or as an alternative, gateway 420 may dynamically receive or retrieve logic as such logic is needed. For example, gateway 420 could be updated with additional logic at any time and may, in certain implementations, receive logic from one or more remote locations. In one embodiment, gateway 420 may receive proxy logic from a remotely located service center, further details of which are described below in connection with FIG. 9. In one instance, gateway 420 may be automatically or manually updated with additional logic when additional components and modules are added to environment 400 or when the application or purpose of work machine 405 changes.

As depicted in FIG. 5, gateway 420 may include an address mapping structure 510, which may be software-implemented, that maps addresses included in incoming messages to appropriate software logic within gateway 420. Gateway 420 may access mapping structure 510 in order to perform virtual control module operations. In certain embodiments, mapping structure 510 may be stored in a memory device within gateway 420 and accessed using one or more processing devices, such as a memory controller or a CPU device. Alternatively, mapping structure 510 may reside external to gateway 420. Mapping structure 510 may include a listing of identifiers associated with proxy logic elements included in gateway 420. Mapping structure 510 may also indicate the data link protocols interfaced by the proxy logic elements. In one exemplary implementation, mapping structure 510 may include, in addition or as an alternative to the above features, information reflective of the functionality or processing capabilities of each proxy logic element included in the gateway. In certain embodiments, mapping structure may be pre-configured according to a particular work machine environment. In addition, or as an alternative, mapping structure 510 may dynamically update its listings in response to gateway 420 receiving additional logic. That is, when gateway 420 is programmed with a given logic element, mapping structure may dynamically update its listing to include an address identifier associated with that logic element. In certain embodiments, mapping structure 510 may be used by gateway 420 to direct received messages to components coupled to data link 422. In such embodiments, mapping structure 510 may include a listing of identifiers reflecting addresses or locations of components coupled to data link 422, e.g., modules 415 and 416. Mapping structure 510 may also reflect associations between modules located with a given work machine (e.g., 405) and logic elements included in a gateway (e.g., 420). Mapping structure 510 may map components coupled to data link 422 to corresponding logic elements in gateway 420.

Figure 6:
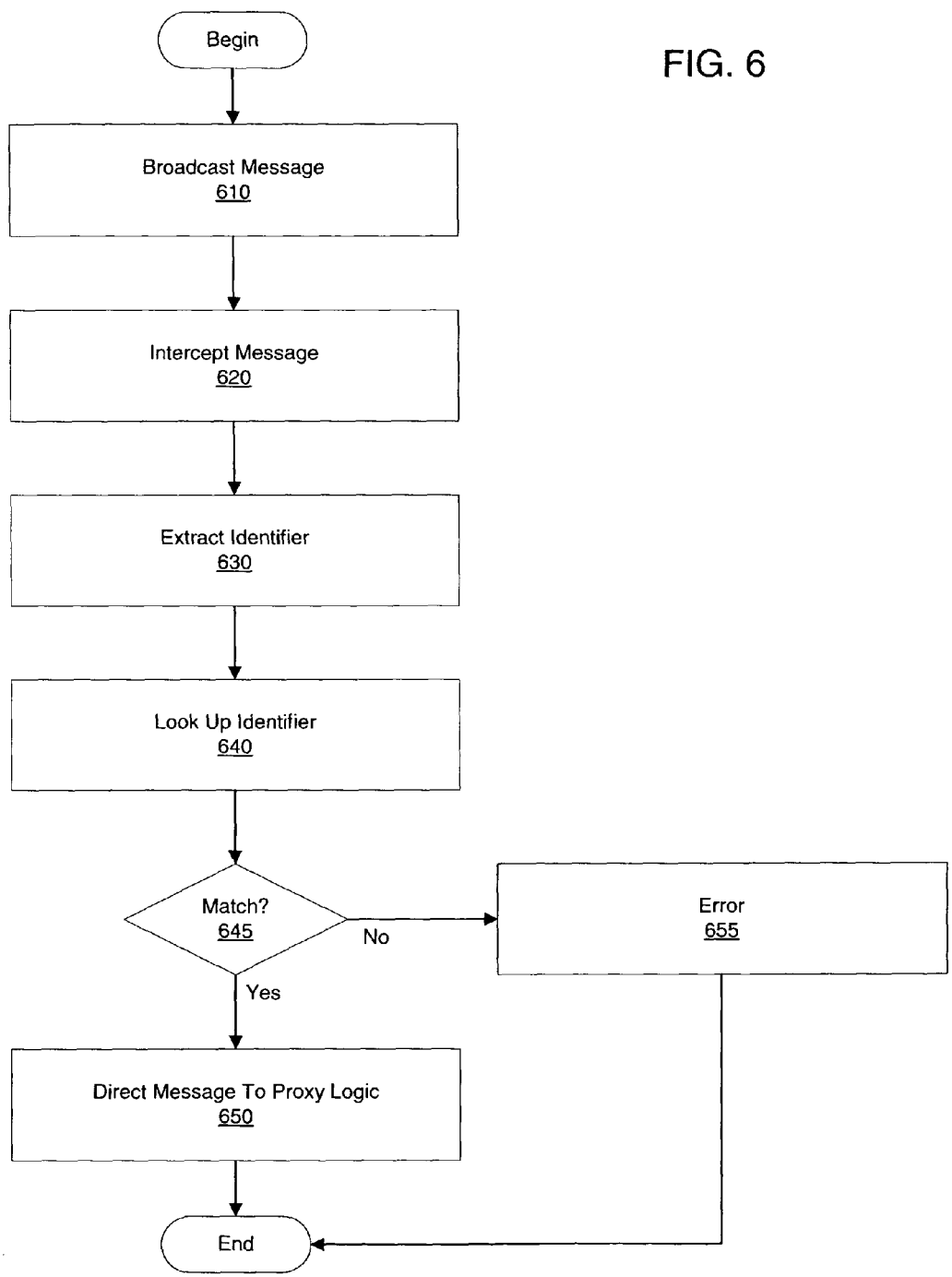
FIG. 6 is a flowchart of an exemplary proxy control process consistent with embodiments of the present invention.

FIG. 6 is a flowchart depicting an exemplary proxy control process consistent with embodiments of the present invention. The illustrated process may begin when a source component coupled to data link 422 broadcasts a message over data link 422 for receipt by one or more destination modules (Step 610). For example, component 415 may transmit a message addressed to a CCM over data link 422. A "message," as used herein, may include any type of data or information, such as numeric, textual, voice, alpha-numeric, etc., values. Further, "messages" may include packaged data or files that include data, executable code, etc., and any other form of information that may be included in an electronic transmission package, signal, message, etc. Messages may also include one or more address identifiers associated with its source and/or destination. An "address identifier" may include any textual, numerical, symbolic, and/or voice recognition element identifying a source or destination for the message in which it is included. In this example (illustrated by message 511 and flow line 513), the message may include a destination address identifier of "0014."

Consistent with embodiments of the present invention, gateway 420 may be configured to monitor an on-board data link for broadcasted messages. Accordingly, gateway 420 may intercept message 511 from data link 422 (Step 620). In certain embodiments, gateway 420 may be configured to intercept messages based on their source. In one example, gateway 420 may be configured to intercept messages originating from a particular module by examining a source address identifier in the broadcasted message. Upon receiving a broadcasted message, gateway 420 may extract a destination address identifier from the message (Step 630). Gateway 420 may compare or match the extracted destination address identifier with identifiers included in address map 510 (Step 640). As explained above, mapping structure 510 may include a list of address identifiers corresponding to proxy logic included in gateway 420. If the address identifier included in the message is not found in mapping structure 510 (Step 645—No), an error message may be generated and transmitted to data link 422 (Step 655). Such an error message may indicate that the message cannot be processed as addressed. In one embodiment, gateway 420 may retrieve or be updated with additional logic as a result of a received address identifier not being found in map 510. If the message address identifier matches an identifier in map 510 (Step 645—Yes), gateway 420 may direct the message to the corresponding logic for processing (Step 650). For example, gateway 420 may direct message 511 to CCM logic 530 included in gateway 420 based on the address identifier "0014."

As explained above, gateway 420 may intercept a message from data link 422 based on its source and then determine whether the message can be processed by proxy logic. In alternative embodiments, gateway 420 may retrieve messages from the data link based on a determination that the message is destined for a module for which the gateway serves as a proxy. In certain embodiments, gateway 420 may be configured to monitor the destination address portion of messages broadcasted by modules over data link 422 in order to determine whether or not a given message should be intercepted for proxy processing. Thus, the determination with respect to whether a given message can be processed by proxy logic may occur prior to the retrieval of the entire message from the data link. In this fashion, gateway 420 may intercept a message (Step 620), match the destination address (Step 640), and route the message for processing (Step 650) only upon identifying a broadcasted message destined for a module for which gateway 420 serves as a proxy.

Once a message is routed to the appropriate logic in gateway 420, that logic may process the message accordingly. In certain embodiments, the proxy logic may then route the received message (or a new message responsive to the received message) over its respective interfaced data-link for receipt by another on-board or off-board component, module, or system. Messages and responses may also be sent from one proxy logic element to another proxy logic element. In addition, or as an alternative, a responsive message may be transmitted by gateway 420 from the proxy logic back to the source module (e.g., module 415).

Although the process of FIG. 6 refers to receiving a message from data link 422, gateway 420 may, additionally or alternatively, receive messages destined for components coupled to data link 422. For example, referring back to FIG.

5, gateway 420 may receive, via data link 554, a message 512 originating from an off-board module (not shown) and destined for component 416 coupled to data link 422. Message 512 may be formatted according to data link 554's protocol. In one example, data link 554 may be a RS-232 data link and message 512 may be in a format consistent with the RS-232 protocol. Message 512 may also include an address identifier. For example, message 512 may include a destination address "0060," which corresponds to GPSIM logic 550. In this example (illustrated by flowline 514), gateway 420 may use mapping structure 510 to identify the appropriate destination module (e.g., 416) and direct the message to the destination module. Mapping structure 510 may, for example, indicate that GPSIM logic 550 is associated with module 416.

In certain embodiments, gateway 420 may perform protocol translation processed to facilitate data exchange between incompatible data links. Gateway may be pre-configured to perform specific translations for specific data links, modules, and proxy logic, and/or may dynamically detect inconsistencies between various device and data link protocols and perform translations accordingly. Additional details of protocol translation are discussed below.

Figure 7:
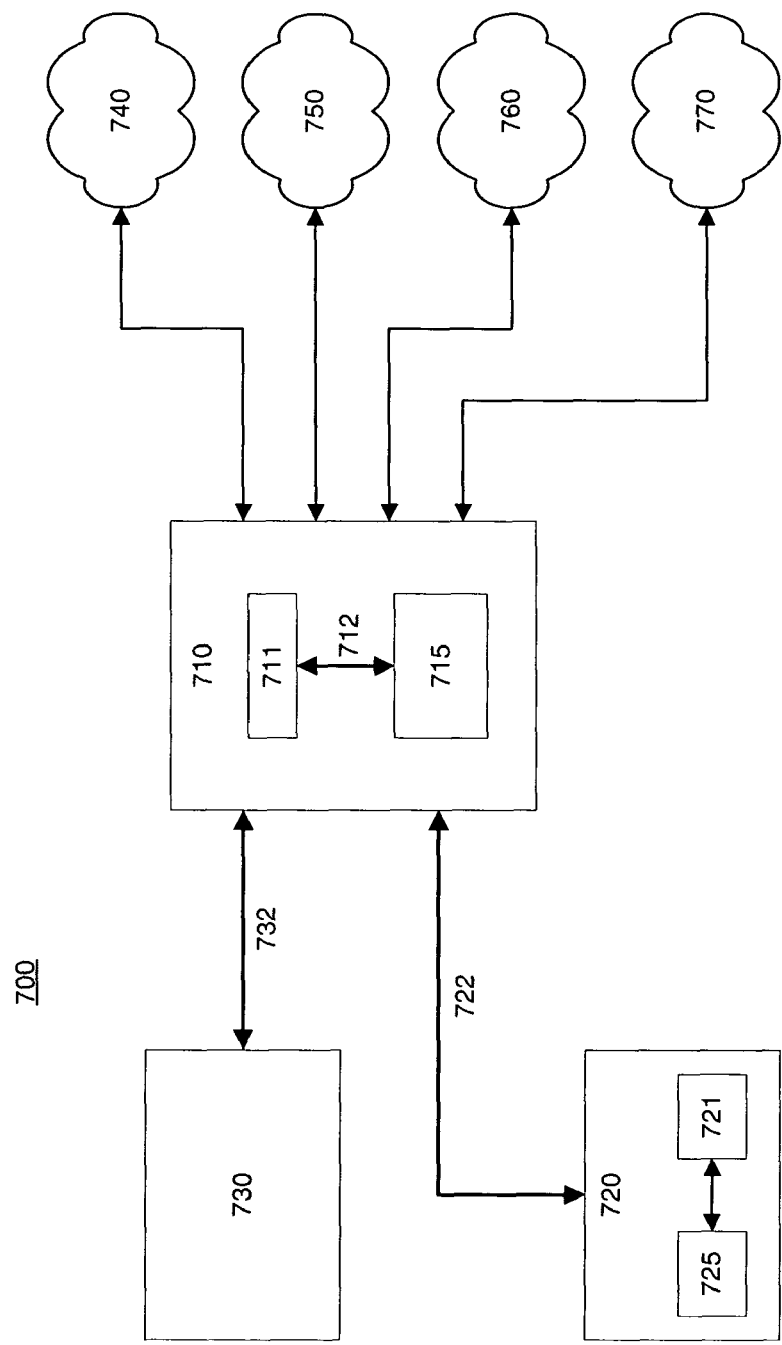
FIG. 7 is a block diagram of an exemplary work machine environment consistent with embodiments of the present invention.

As explained above, gateway 420 may provide proxy services to modules coupled to a data link located within a given work machine. Consistent with embodiments of the present invention, one or more gateways may also be leveraged to provide proxy control in an off-board work machine environment. In such an environment, a single gateway within a given work machine may process messages originating from one or more off-board modules via proxy control logic. FIG. 7 is a block diagram of an exemplary off-board environment consistent with such embodiments.

As shown in FIG. 7, a work machine 710 may include a gateway 715, which may be configured, and operates, similarly to gateway 420 described in connection with FIG. 4. Work machine 710, which may be mobile or fixed, may also include one or more modules 711, which may be similar to modules 415 and 416. As illustrated, work machine 710 may include one or more on-board data links 712, which may be similar to on-board data link 422 in FIG. 4. Gateway 715 may execute one or more server applications that allow work machine 710 to communicate with one or more off-board elements, such as one or more other work machines 720, one or more external systems 730, and/or one or more external networks such as a Wide Area Satellite Wireless Network (WASWN) 740, a Wireless Local Area Network (WLAN) 750, a Wide-Area Terrestrial Wireless Network (WATWLN) 760, and/or a Wide Area Network (WAN) 770.

WASWN 740 may be a satellite radio network that includes infrastructure allowing communications between one or more satellite devices and a remote system, such as computer system 140 described in connection with FIG. 1. WLAN 750 may be a wireless radio network including infrastructure that facilitates communications between one or more wireless radio devices and a remote system, such as computer system 140. WATWLN 760 may be a wireless network that includes infrastructure allowing communications between one or more cellular devices and a remote system (e.g., computer system 140). WAN 770 may be a network including the infrastructure that allows for Internet access, such as the World Wide Web.

As illustrated, work machine 720 may include a gateway 725 that may be configured and operates similar to gateway 120. Work machine 720 may also include one or more modules 721, which may be similar to modules 415 and 416. Work machine 720 may be a mobile or fixed work machine connected to work machine 710 through a wireline or wireless data link 722. External system 730 may represent a remote system that communicates with gateway 715 through a wireless or wireline data link 732, such as computer system 130, computer system 140, or service port system 150.

Although FIG. 7 shows work machine 720 and external system 730 connected to work machine 710 through dedicated data links, these elements may also be configured to communicate with gateway 715 through one or more of networks 740, 750, 760, and 770.

Figure 8:
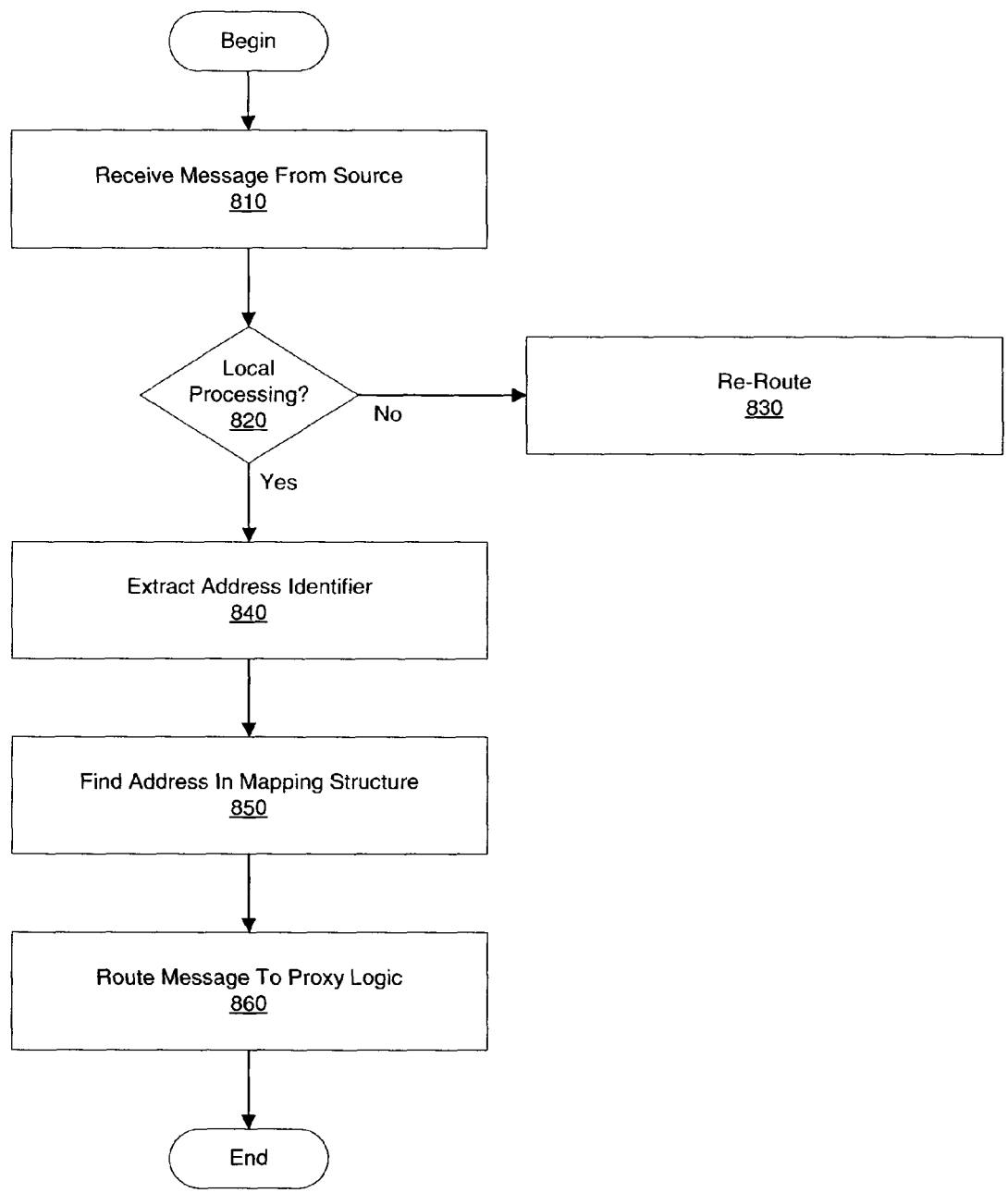
FIG. 8 is a flowchart of an exemplary process consistent with embodiments of the present invention.

FIG. 8 is a flowchart depicting an exemplary proxy control method consistent with embodiments of the present invention. The illustrated process may begin when gateway 715 retrieves or receives a message from an external source (Step 810). For example, gateway 715 may receive a message from external system 730 via off-board data link 732. The received message may include a corresponding source and/or destination address identifier. In certain embodiments, gateway 715 may be configured to determine whether the received message should be processed locally or should be routed to another work machine for subsequent processing or additional routing. For example, gateway 715 may examine the destination address to determine whether the message is destined for a module in work machine 710 or if it can be processed by proxy logic include in gateway 715. This determination may, in one example, be facilitated by mapping structure 510. If the received message is not destined for local processing (Step 820—No), gateway 715 may forward or re-route the message (e.g., by consulting map 510) to another work machine or external system (Step 830). Additionally, or alternatively, gateway 715 may transmit an error message back to the message source, indicating that the message cannot be processed as addressed.

If, however, gateway 715 determines that the received message can be locally processed (Step 820—Yes), then gateway 715 may extract the destination address identifier (Step 840). Gateway 715 may find the extracted destination address in mapping structure 510 (Step 850) and route the message to the appropriate control logic (Step 860). For example, gateway 715 may determine that the received message is destined for an EVIM module and may, therefore, route the message to EVIM proxy logic 540. In this fashion, the source module may be unaware of the fact that gateway 715 is acting as a proxy for the destination module. That is, external systems may transmit a message destined to a particular destination module within a work machine, and gateway 715 may (transparent to the source) intercept the message and process it via appropriate proxy logic. Upon receiving the message, the proxy control logic may generate a response to the received message, and the response may be routed back to the source module via gateway 715.

Figure 9:
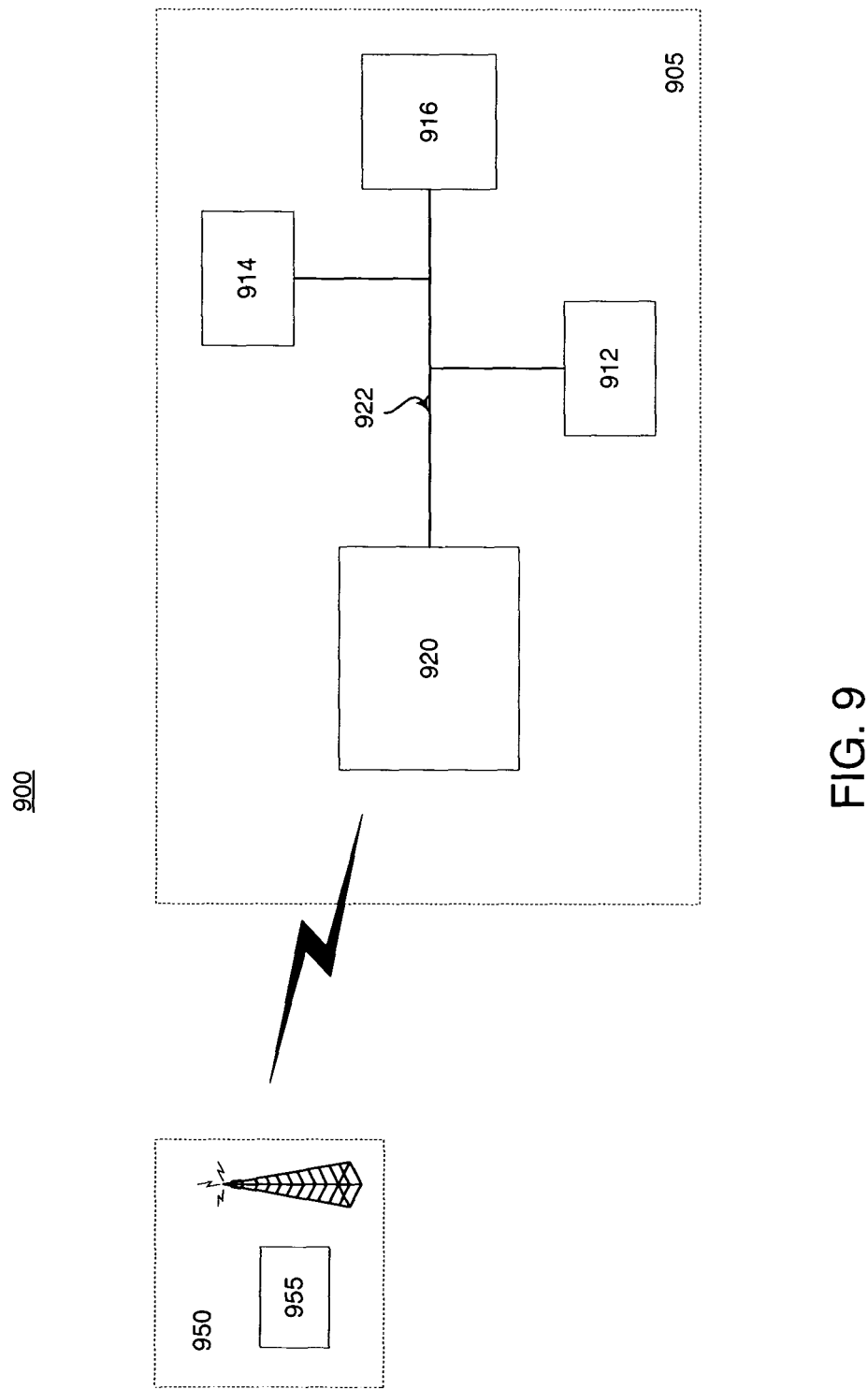
FIG. 9 is a block diagram of an exemplary controller-based work machine environment consistent with embodiments of the present invention.

In addition to providing proxy services for specialized components, one or more gateways may, in certain embodiments, be configured to serve as a virtual master controller. Moreover, in certain embodiments of the present invention, one or more gateways configured with proxy logic may provide virtual control in both wireline and wireless work machine environments. FIG. 9 is block diagram of an exemplary environment consistent with such embodiments. As FIG. 9 illustrates, gateway 920 may be may be included in a controller-based environment 900. Gateway 920 may be similar to gateway 420 of FIG. 4. In the illustrated system of FIG. 9, gateway 920 may be configured to replace a master controller device that manages the operation of multiple components connected to an on-board network. Gateway 920 may therefore include proxy logic corresponding to various elements included in a master controller. In this exemplary configuration, gateway 920 may interface with different on-board elements (912, 914, 916) through their appropriate data links (e.g., 922). Gateway 920 may also interface with a master controller 955 located off-board and remote to work machine 905, e.g., in a service center 950. A "service center" may include any combination of elements, entities, systems, and controllers for directing, maintaining, and/or servicing various work machines and/or modules implemented in a given environment. Service center 950 and master controller 955 may remotely control operations of a plurality of work machines and systems, including work machine 905. Gateway 920 may leverage one or more wireless data links to communicate with master controller 955. On-board elements may include any type of modules, components and systems and may be similar to elements 414, 415, and 416 of FIG. 4.

Although three on-board modules or shown in FIG. 9, gateway 920 may be configured to serve as a virtual master controller for any number of modules, both on-board and off-board. Further, although a single work machine and gateway are depicted in FIG. 9, a plurality of geographically dispersed work machines, each including one or more gateways, may be implemented in system 900. In such system configurations, each gateway may serve as an embedded virtual master controller for its respective work machine and may therefore enable a single master controller (e.g., 955) to direct a plurality of geographically dispersed work machines from a central location.

In the environment shown in FIG. 9, gateway 920 may receive and service messages from elements 912, 914, and 916. Consistent with certain embodiments of the present invention, gateway 920 may be configured to intercept messages from data link 922 (e.g., based on source and/or destination address identifiers) and route the intercepted messages to appropriate proxy logic for processing via an address map similar to mapping structure 510. In one embodiment, an intercepted message may be routed to appropriate proxy logic based on its intended destination. Additionally, or as an alternative, intercepted messages may be routed to appropriate proxy logic based on the type of processing needed. For example, messages sent from modules and systems (e.g., 912, 914, and 916) may all be intended for a master controller but may require different processing. Thus, gateway 920, acting as a virtual controller, may intercept the messages, determine the message types, and route each message, using the address map, to appropriate logic based on the type of processing each message requires. In certain embodiments, gateway 920 may issue commands to modules (e.g., 912, 914) and exchange information with master controller 955 in service center 950. Gateway 920, may for example, receive messages from master controller 955 and issue corresponding commands to elements 912, 914, and 916. Gateway 920 may also acquire status and diagnostic information from modules and systems (912, 914, 916), e.g., in response to queries from master controller 955. Consistent with embodiments of the present invention, gateway 920 may be pre-configured with proxy logic corresponding to functions associated with master controller 955. Gateway 920 may additionally, or alternatively, dynamically receive proxy logic from master controller 955 or another element within service center 950. In one example, gateway 920 may receive proxy control logic from service center 950 as modules are implemented in work machine 905.

In addition, or as an alternative, to providing proxy control services for on-board and/or off-board components that may be interfaced with a gateway (as discussed above), methods and systems of the present invention may facilitate information exchange among and between proxy logic elements within a given gateway. In both on-board and off-board environments, messages may originate at one or more proxy logic elements located in a gateway and may be destined for another module for which that gateway is serving as a proxy. For example, referring back to FIG. 5, CCM proxy logic 530 may generate (or receive from data link 534) a message intended for an EVIM. Accordingly, gateway 420 may use mapping structure 510 to route the message from proxy logic 530 to proxy logic 540. Such routing may be transparent to both the message source and destination. In addition, referring back to FIG. 7, gateway 715 may transmit a message originating from (or received by) proxy logic included in gateway 715 over data link 722 for receipt by a destination module in work machine 720. Gateway 725 in work machine 720 may serve a proxy for the destination module and may therefore intercept the message and route it to corresponding proxy logic included in gateway 725. Such intercepting and routing may be transparent to the message source and destination.

Protocol Translation

As discussed above, gateway 420 may, in certain embodiments, perform protocol translation processes to facilitate communications between different types of data links, whether on-board or off-board. Gateway 420 may be configured to translate messages received from components interfaced with proxy logic elements into messages consistent with the data link protocol associated with the destination module. For example, using mapping structure 510, gateway 420 may translate message 512 into a message consistent with data link 422's protocol.

As used herein, the term "translating" refers to converting messages from one data link protocol into comparable messages of another protocol. In exemplary translation processes consistent with the present invention, protocol-specific parameters may be translated between different data links. For example, data messages may be translated from an off-board data link protocol (e.g., Ethernet) into data values compatible with an on-board data link protocol (e.g., J1939). Such parameters may include operational parameters, such as engine speed, injection rates, component and/or area temperatures, pressures, etc. corresponding to systems, modules and components located in a work machine environment. Further, parameters may include, or be associated with, engine diagnostic and performance parameters associated with an ECM. Parameters may also reflect commands or be used to perform certain actions. Messages from modules in a work machine environment may include one or more commands to adjust one or more parameter data values based on, for example, a requested action directed to a work machine. In one instance, a message may include a request to increase engine speed of a particular work machine by adjusting, or requesting adjustment of, data values associated with an engine speed parameter.

Consistent with principles of the present invention, a communication application may perform translating processes for any number of protocols. Messages from multiple and different data links may be discretely or simultaneously translated and sent out on a single data link. Messages may also be received from a single data link and discretely or simultaneously translated and sent out over multiple and different data links. Non-limiting examples of translations include: (1) CDL and J1939 to MODBUS; (2) CDL to ISO11783; (3) CDL to J1939; (4) ATA to J1939; and vice versa. In certain embodiments, gateway 420 may include hardware, firmware, and/or software for performing translation processes. For example, model 300 may include an inter-data link gateway layer 350, including one or more gateway applications 350-1 to 350-T that perform translation processes.

Consistent with principles of the present invention, gateway 420 may maintain a translation data structure, such as a translation table, that maps parameters between data links for facilitating protocol translations. Gateway 420 may access the translation table in order to convert information from one protocol compatible data value to another. In certain embodiments, the translation table may be stored in a memory device within the gateway. See, for example, gateway 120 and its digital core 202's memory 210 accessed by processor 205. Further, the translation table may include a plurality of parameter identifiers (PIDs) representing system parameters associated with various data link protocols. For example, a first PID may represent an engine speed (RPM) parameter associated with certain protocols and a second PID may represent a temperature parameter. The translation table may include any number of different PIDs.

Also, the translation table may also include one or more scaling factors, each representing a data link "view." Each view may correspond to a particular protocol interfaced by gateway 420, such as a proprietary data link view, an Ethernet data link (i.e., Web) view, a J1939 view; and a RS-422 view. The translation table may include any number of views corresponding to data links interfaced by gateway 420. Each "view" may enable its associated data link to interpret parameter data stored in a universal storage location. This location represents a memory location or locations that store one or more values corresponding to a particular parameter (i.e., parameter data). Parameter data may be received from one or more data links interfaced by gateway 420.

Moreover, each data link view may include a scale factor corresponding to translation logic used by gateway 420 to translate parameter data stored in the US to an appropriate format for the particular data link protocol. In certain embodiments, all views represented by translation table may support a given parameter. For example, an RPM parameter may exist in all of the protocols mapped by the translation table. In some cases, however, certain parameters may be supported by less than all of the views mapped by the translation table. For example, a temperature parameter may be supported by a PDL, Ethernet, and J1939 but not by RS-422. The scale factor for such non-supporting views may be null or set to zero.

In addition, each view in the translation table may include a specific read/write privilege to the universal storage location. That is, certain data links may be assigned write privileges to this location, while other data links have only read access.

Consistent with embodiments of the present invention, the translation table may be pre-configured with a plurality of parameter identifiers and scale factors corresponding to a plurality of data links interfaced by gateway 420. In operation, gateway 420 may receive a message, including a PID and corresponding parameter data, from a particular data link. In response to such a message, gateway 420 may extract the PID and store the parameter data in the universal storage location. In addition, gateway 420 may use the PID to scale the parameter data according to the scale factors included in the translation table, thereby creating multiple "views" of the parameter data. In one example, gateway 420 may receive a request for parameter data from a particular data link. The request may include a PID corresponding to the requested data. In response to such a request, gateway 420 may extract the PID from the request and scale the requested parameter data (previously stored in the universal storage location) using a scale factor corresponding to the extracted PID and requesting data link protocol.

For additional clarity of explanation, systems 100-400, 700, and 900 are described herein with reference to the discrete functional elements illustrated in FIGS. 1-5, 7, and 9. However, it should be understood that the functionality of the illustrated elements and modules may overlap and/or may exist in a fewer or greater number of elements and modules. Elements of each system may, depending on the implementation, lack certain illustrated components and/or contain, or be coupled to, additional or varying components not shown. Moreover, all or part of the functionality of the illustrated elements may co-exist or be distributed among several geographically dispersed locations.

In addition, the steps illustrated in the flowcharts of FIGS. 6 and 8 are consistent with exemplary implementations of the present invention. Further, it should be understood that the sequence of events described in FIGS. 6 and 8 are exemplary and not intended to be limiting. Thus, other method steps may be used, and even with the methods depicted in FIGS. 6 and 8, the particular order of events may vary without departing from the scope of the present invention. Moreover, certain steps may not be present and additional steps may be implemented in FIGS. 6 and 8. In addition, it should be understood that the illustrated stages may be modified with departing from the scope of the present invention. For example, in certain embodiments, gateway 420 may be configured to monitor the destination address portion of messages broadcasted over data link 422 in order to determine whether or not a message should be intercepted for proxy processing. Thus, the determination with respect to whether a given message can be locally processed by proxy logic may occur prior to the retrieval of the entire message from the data link.

Industrial Applicability

Consistent with embodiments of the present invention, methods and systems may provide proxy control functions in a work machine environment, whether on-board or off-board. In certain embodiments, a single gateway may be configured as a proxy control module, replacing a plurality of distinct devices. For example, gateway 120 may be configured to replace one or more control modules needed in a particular work machine environment. In such embodiments, gateway 120 may be programmed with proxy logic corresponding to the control modules it replaces. Gateway 120 may be coupled to an on-board data link (which may be a PDL) and leverage a mapping structure to recognize addresses of the control modules for which it is representing as a proxy. Accordingly, a message directed to an address that would otherwise be recognized by an on-board network as associated with an actual control module will be intercepted by gateway 120 and processed accordingly. In this fashion, gateway 120 may serve as a virtual control module.

Systems and methods of the present invention may be leveraged to consolidate features of various special purpose control modules. In certain embodiments, a single gateway may replace a plurality of distinct control modules in a given work machine environment. For example, a single gateway may replace one or more of a CCM, DNTM, EVIM, and a GPSIM. Systems and methods of the present invention may provide services associated with a plurality of specialized components without adapters to multiple on-board networks.

In certain embodiments of the present invention, a single gateway may be configured to serve as a virtual master controller in a given work machine. Such a gateway may include proxy logic corresponding to various functions associated with a master controller. By implementing virtual master controllers in a work machine environment, a single master controller located in a service center may direct a plurality of geographically dispersed work machines via respective gateways embedded in the work machines. In one embodiment, a master controller may be located in a service center that remotely controls a plurality of work machines and modules. Gateways embedded in the work machines may interact with such a master controller via wireless data links and serve as virtual master controllers for modules and systems in their respective work machines. In this fashion, a plurality of gateways may replace multiple master controllers in a work machine environment.

The embodiments, features, aspects, and principles of the present invention may be implemented in various environments and are not limited to work site environments. For example, a work machine with an embedded gateway may perform the functions described herein in other environments, such as mobile environments between job sites, geographical locations, and settings. Further, the processes disclosed herein are not inherently related to any particular system and may be implemented by a suitable combination of electrical-based components. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A system for processing messages in a work machine environment, comprising:
   a first work machine including a first gateway and a first destination module; and
   a second work machine including a second gateway and a second destination module,
   wherein the first gateway is configured to:
   receive a first message having an identifier that identifies a destination module as a target for the first message, and
   determine, based on the identifier, whether to process the first message with the first gateway or to route the first message from the first gateway, wherein:
   when the first gateway can process the first message, it performs functions similar to those of the first destination module using data included in the first message, and
   when the first gateway cannot process the first message, it routes the first message to the second gateway.

2. The system of claim 1, wherein the second gateway is configured to:
   determine, based on the identifier, whether to process the first message within the second gateway or to route the first message from the second gateway, wherein:
   when the second gateway can process the first message, it performs functions similar to those of the second destination module using data included in the first message, and
   when the second gateway cannot process the first message, it routes the first message from the second gateway.

3. A method for processing messages in a work machine environment, comprising:
   receiving, at a first gateway located in a first work machine, a message addressed to a destination module located in a work machine;
   performing by the first gateway functions associated with the destination module, when the first gateway is able to process the message; and
   routing the message from the first gateway to a second gateway located in a second work machine, when the first gateway is unable to process the message.

4. The method of claim 3, further comprising:
   receiving at the second gateway the message from the first gateway, if the first gateway routes the message to the second gateway;
   performing by the second gateway functions associated with the destination module, when the second gateway is able to process the message; and
   routing the message from the second gateway, when the second gateway is unable to process the message.

* * * * *